(12) United States Patent
Lee

(10) Patent No.: US 12,461,342 B2
(45) Date of Patent: Nov. 4, 2025

(54) IMAGING LENS SYSTEM WITH WIDE FIELD OF VIEW

(71) Applicant: Samsung Electro-Mechanics Co., Ltd., Suwon-si (KR)

(72) Inventor: Da Ye Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 469 days.

(21) Appl. No.: 17/970,125

(22) Filed: Oct. 20, 2022

(65) Prior Publication Data

US 2024/0019669 A1    Jan. 18, 2024

(30) Foreign Application Priority Data

Jul. 14, 2022    (KR) .................. 10-2022-0086796

(51) Int. Cl.
  *G02B 9/64*  (2006.01)
  *G02B 13/06*  (2006.01)

(52) U.S. Cl.
  CPC .............. *G02B 9/64* (2013.01); *G02B 13/06* (2013.01)

(58) Field of Classification Search
  None
  See application file for complete search history.

(56) References Cited

U.S. PATENT DOCUMENTS

| | | |
|---|---|---|
| 2017/0242220 A1 | 8/2017 | Lee |
| 2018/0157007 A1 | 6/2018 | Kim et al. |
| 2018/0172963 A1* | 6/2018 | Kim ........................ G02B 13/18 |
| 2018/0259744 A1 | 9/2018 | Pao et al. |
| 2018/0348491 A1* | 12/2018 | Lee ............................ G02B 9/64 |
| 2019/0154991 A1 | 5/2019 | Kim et al. |
| 2019/0187442 A1* | 6/2019 | Jia ............................. G02B 9/64 |
| 2019/0324232 A1* | 10/2019 | Yang ........................ G02B 9/64 |
| 2020/0142158 A1* | 5/2020 | Yao ........................ G02B 13/04 |
| 2020/0209555 A1 | 7/2020 | Shimoeda |
| 2020/0301105 A1 | 9/2020 | Jung et al. |

(Continued)

FOREIGN PATENT DOCUMENTS

| | | |
|---|---|---|
| CN | 107797261 A | 3/2018 |
| CN | 108152914 A | 6/2018 |

(Continued)

OTHER PUBLICATIONS

Taiwanese Office Action Issued on Mar. 29, 2023, in Counterpart Taiwanese Patent Application No. 111140984 (12 Pages in English, 10 Pages in Chinese).

(Continued)

*Primary Examiner* — Darryl J Collins
(74) *Attorney, Agent, or Firm* — NSIP Law

(57) ABSTRACT

An imaging lens system is provided. The imaging lens system includes a first lens having refractive power, a second lens having refractive power, a third lens having a concave object-side surface, a fourth lens having refractive power, a fifth lens having refractive power, a sixth lens having a concave object-side surface, and a seventh lens having refractive power. The first to seventh lenses may be sequentially disposed from an object side to an imaging side. In the imaging lens system, $20<V1-V3$ and $190°\leq FOV$, where V1 is an Abbe number of the first lens, V3 is an Abbe number of the third lens, and FOV is a field of view of the imaging lens system.

18 Claims, 22 Drawing Sheets

(56) References Cited

U.S. PATENT DOCUMENTS

| | | | |
|---|---|---|---|
| 2021/0080694 A1* | 3/2021 | Yao | G02B 13/06 |
| 2021/0173182 A1 | 6/2021 | Dai et al. | |
| 2021/0191087 A1 | 6/2021 | Komiyama et al. | |
| 2021/0364744 A1* | 11/2021 | Wang | G02B 13/18 |
| 2022/0066173 A1 | 3/2022 | Yao et al. | |
| 2022/0214523 A1 | 7/2022 | Lai et al. | |
| 2022/0390722 A1* | 12/2022 | Syu | G02B 13/0045 |
| 2023/0083945 A1* | 3/2023 | Lai | G02B 9/64 |
| | | | 359/708 |
| 2023/0161137 A1 | 5/2023 | Tsai | |
| 2023/0288669 A1 | 9/2023 | Chen et al. | |
| 2024/0004169 A1 | 1/2024 | Lee | |
| 2024/0159995 A1 | 5/2024 | Bao et al. | |

FOREIGN PATENT DOCUMENTS

| | | |
|---|---|---|
| CN | 109313323 A | 2/2019 |
| CN | 210835411 U | 6/2020 |
| CN | 112051659 A | 12/2020 |
| CN | 112083554 A | 12/2020 |
| CN | 112526727 A | 3/2021 |
| CN | 112882209 A | 6/2021 |
| CN | 112987233 A | 6/2021 |
| CN | 112987263 A | 6/2021 |
| CN | 113031212 A | 6/2021 |
| CN | 113031230 A | 6/2021 |
| CN | 113156627 A | 7/2021 |
| CN | 113589486 A | 11/2021 |
| CN | 114047597 A | 2/2022 |
| CN | 114114612 A | 3/2022 |
| CN | 114488492 A | 5/2022 |
| CN | 114509863 A | 5/2022 |
| CN | 114578527 A | 6/2022 |
| CN | 115508990 A | 12/2022 |
| JP | 2019-53113 A | 4/2019 |
| JP | 2019-66645 A | 4/2019 |
| KR | 10-2017-0098064 A | 8/2017 |
| KR | 10-2019-0058033 A | 5/2019 |
| TW | 201833618 A | 9/2018 |
| TW | M573434 U | 1/2019 |
| TW | M575119 U | 3/2019 |
| TW | 202122861 A | 6/2021 |
| TW | M618542 U | 10/2021 |
| TW | I792749 B | 2/2023 |
| TW | 202314316 A | 4/2023 |
| TW | 202318067 A | 5/2023 |
| TW | 202336483 A | 9/2023 |
| TW | 202403377 A | 1/2024 |

OTHER PUBLICATIONS

Chinese Office Action Issued on Apr. 4, 2023, in Counterpart Chinese Patent Application No. 202223543613.9 (3 Pages in English, 2 Pages in Chinese).

Taiwanese Office Action issued on Dec. 21, 2023, in counterpart Taiwanese Patent Application No. 112138777 (7 pages in English, 8 pages in Chinese).

Taiwanese Office Action issued on Jun. 27, 2024, in counterpart Taiwanese Patent Application No. 113121748 (10 pages in English, 11 pages in Chinese).

Taiwanese Office Action Issued on Jan. 15, 2025, in Counterpart Taiwanese Patent Application No. 113150338 (14 Pages in English, 9 Pages in Chinese).

Chinese Office Action issued on May 15, 2025 in corresponding Chinese Patent Application No. CN202211724372.X(5 pages in English, 8 pages in Chinese).

Taiwanese Office Action Issued on Aug. 14, 2025, in Counterpart Taiwanese Patent Application No. 114126510 (15 Pages in English, 10 Pages in Chinese).

* cited by examiner

IMAGING LENS SYSTEM WITH WIDE FIELD OF VIEW

CROSS-REFERENCE TO RELATED APPLICATIONS

This application claims the benefit under 35 USC § 119(a) of Korean Patent Application No. 10-2022-0086796 filed on Jul. 14, 2022, in the Korean Intellectual Property Office, the entire disclosure of which is incorporated herein by reference for all purposes.

BACKGROUND

1. Field

The following description relates to an imaging lens system, mountable in a camera with a wide field of view (FOV).

2. Description of Related Art

Recently produced vehicles are equipped with cameras to significantly reduce liability for damage to persons and property caused by traffic accidents. For example, one or more cameras may be installed on front and rear bumpers of a vehicle to provide a driver with information on objects disposed to the front and rear of the vehicle. Since it is important for a vehicular camera to accurately recognize objects around a vehicle and to provide recognized information to a driver, an imaging lens system having high-resolution performance and a wide field of view is desired.

However, it may be difficult to mount an imaging lens system having a high resolution and a wide field of view in a vehicle camera due to the limitations with regard to an installation location. For example, to implement a vehicular camera having a low f number, diameters of a forwardmost lens and other lenses should large, but it may be difficult to arbitrarily change sizes of the lenses due to structural and design limitations of vehicular components (for example, bumpers) on which a camera is mounted.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, an imaging lens system includes a first lens having refractive power; a second lens having refractive power; a third lens having a concave object-side surface; a fourth lens having refractive power; a fifth lens having refractive power; a sixth lens having a concave object-side surface; and a seventh lens having refractive power; wherein the first to seventh lenses are sequentially disposed from an object side to an imaging side, and wherein: $20 < V1 - V3$, and $190° \leq FOV$, where V1 is an Abbe number of the first lens, V3 is an Abbe number of the third lens, and FOV is a field of view of the imaging lens system.

The third lens may have positive refractive power.
The fourth lens may have positive refractive power.
The fourth lens may have a concave object-side surface.
The fifth lens may have a convex object-side surface.
The sixth lens may have a concave image-side surface.
The seventh lens may have a convex object-side surface.

In the imaging lens system, $5.0 \text{ mm} < f1234 < 12.5 \text{ mm}$, where f1234 is a synthetic focal length of the first lens to the fourth lens.

In the imaging lens system, $5.50 \text{ mm} < f567 < 10.0 \text{ mm}$, where f567 is a synthetic focal length of the fifth lens to the seventh lens.

In a general aspect, an imaging lens system includes a first lens having negative refractive power; a second lens having negative refractive power; a third lens having refractive power; a fourth lens having concave object-side surface; a fifth lens having refractive power; a sixth lens having refractive power; and a seventh lens having refractive power, wherein: $-3.6 < (f5+f7)/f6 < -2.6$, and $8.0 < TTL/f < 10.0$, where f is a focal length of the imaging lens system, f5 is a focal length of the fifth lens, f6 is a focal length of the sixth lens, f7 is a focal length of the seventh lens, and TTL is a distance from an object-side surface of the first lens to an imaging plane.

$190° \leq FOV$, where FOV is a field of view of the imaging lens system.

$-1.0 < f1/f4 < -0.1$, where f1 is a focal length of the first lens, and f4 is a focal length of the fourth lens.

$-2.0 < f1/f7 < -1.0$, where f1 is a focal length of the first lens.

$-2.0 < f5/f6 < -1.0$.

$2.0 < (R7+R8)/(R7-R8) < 8.0$, where R7 is a radius of curvature of an object-side surface of the fourth lens, and R8 is a radius of curvature of an image-side surface of the fourth lens.

$0.20 < ImgHT/TTL < 0.30$, where ImgHT is a height of the imaging plane. In a general aspect, an imaging lens system includes a first lens having negative refractive power; a second lens having negative refractive power; a third lens having positive refractive power; a fourth lens having positive refractive power; a fifth lens having positive refractive power; a sixth lens having negative refractive power; and a seventh lens having positive refractive power; wherein the first to seventh lenses are sequentially disposed from an object side to an imaging side, wherein the fifth lens image-side surface is spaced apart from the sixth lens object-side surface and the sixth lens image-side surface is spaced apart from the seventh lens object-side surface, and wherein $190° \leq FOV$, where FOV is a field of view of the imaging lens system.

The third lens and the fourth lens may have concave object-side surfaces.

The second lens may have a concave object-side surface.

$20 < V1-V3$, $-3.6 < (f5+f7)/f6 < -2.6$, and $8.0 < TTL/f < 10.0$, where V1 is an Abbe number of the first lens, V3 is an Abbe number of the third lens, f is a focal length of the imaging lens system, f5 is a focal length of the fifth lens, f6 is a focal length of the sixth lens, f7 is a focal length of the seventh lens, and TTL is a distance from an object-side surface of the first lens to an imaging plane.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
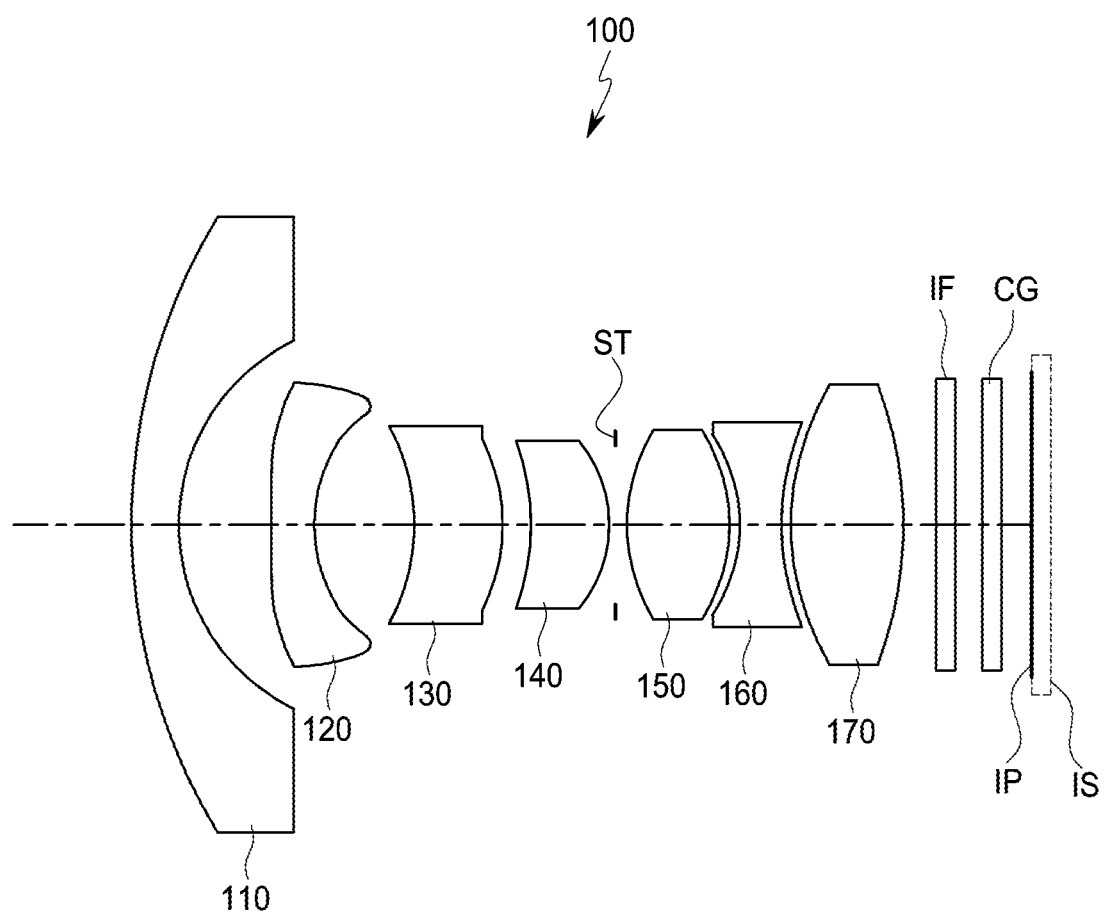
FIG. 1 illustrates a configuration of an example imaging lens system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

One or more examples provide an imaging lens system having a high resolution and a wide field of view while significantly reducing a change in sizes of lenses.

In the examples, a first lens refers to a lens most adjacent to an object (or a subject), and a seventh lens refers to a lens most adjacent to an imaging plane (or an image sensor). In the example embodiments, units of a radius of curvature, a thickness, a TTL (a distance from an object-side surface of the first lens to an imaging plane), an ImgHT (a height of an imaging plane), a focal length, and an effective radius are indicated in millimeters (mm).

A thickness of a lens, a gap between lenses, and a TTL refer to a distance of a lens in an optical axis. Additionally, in the descriptions of a shape of a lens, the configuration in which one surface is convex indicates that a paraxial region of the corresponding surface is convex, and the configuration in which one surface is concave indicates that a paraxial region of the surface is concave. Thus, even when it is described that one surface of a lens is convex, an edge of the lens may be concave. Similarly, even when it is described that one surface of a lens is concave, an edge of the lens may be convex.

An imaging lens system described herein may be configured to be mounted on a transport device. For example, the imaging lens system may be mounted on the front and the rear monitoring cameras or an autonomous driving camera mounted on a car, a truck, a freight car, a fire truck, forklift, or the like. However, a range and an example of use of the imaging lens system described herein are not limited to the above-described devices. For example, the imaging lens system may be mounted on an image-capturing camera of a surveillance drone, a transport drone, or the like.

An optical imaging system according to a first aspect may include a plurality of lenses. For example, the imaging lens system may include a first lens, a second lens, a third lens, a fourth lens, a fifth lens, a sixth lens, and a seventh lens sequentially arranged from an object side to an imaging side. The imaging lens system according to the first aspect may include a lens having a concave object-side surface. For example, in the imaging lens system according to the first aspect, each of the third lens and the sixth lens may have a concave object-side surface. The imaging lens system according to the first aspect may be configured to have a wide field of view (FOV). For example, the field of view of the imaging lens system according to the first aspect may be 190 degrees or more. Additionally, the imaging lens system according to the first aspect may satisfy a predetermined conditional expression in relation to an Abbe number V1 of the first lens and an Abbe number V3 of the third lens. For example, the imaging lens system according to the first aspect may satisfy the following conditional expression:

$$20 < V1 - V3$$

The imaging lens system according to the first aspect may further include other optical elements, as necessary. For example, the imaging lens system according to the first aspect may further include a stop. The stop may be disposed between one lens and another lens. For example, the stop may be disposed between the fourth lens and the fifth lens. As another example, the stop may be disposed between one lens and another lens having the same refractive power.

An imaging lens system according to a second aspect may include a plurality of lenses. For example, the imaging lens system may include a first lens, a second lens, a third lens, a fourth lens, a fifth lens, a sixth lens, and a seventh lens sequentially arranged from an object side to an imaging side. The imaging lens system according to the second aspect may include a lens having a negative refractive power. For example, in the imaging lens system according to the second aspect, each of the first lens and the second lens may have a negative refractive power. The imaging lens system according to the second aspect may include a lens having a concave object-side surface. For example, in the imaging lens system according to the second aspect, the fourth lens may have a concave shape on the side of the object. The imaging lens system according to the second aspect may establish a predetermined numerical relationship in relation to a focal length f, a focal length f5 of the fifth lens, a focal length f6 of the sixth lens, a focal length f7 of the seventh lens, and a distance from an object-side surface of the first lens to an imaging plane (TTL). For example, the imaging lens system according to the second aspect may satisfy the following conditional expression:

$$-3.6 < (f5 + f7)/f6 < -2.6$$

$$8.0 < TTL/f < 10.0$$

An imaging lens system according to a third aspect may be configured to satisfy one or more conditional expressions, among the following conditional expressions. For example, the imaging lens system according to the third aspect may include seven lenses, and may satisfy two or more conditional expressions, among the following conditional expressions. As another example, the imaging lens system according to the third aspect may include seven lenses, and may be configured to satisfy all of the following conditional expressions. As another example, the imaging lens system according to the third aspect may satisfy one or more conditional expressions, among the following conditional expressions, while having features of one of the imaging lens systems according to the first and second aspects described above.

$$HFOV/L1S1ED < 15.75°/mm$$

$$0.65 < L1S1ED/TTL$$

$$0 < f1/f2$$

$$f1 < 0 \text{ mm}$$

$$f1/f3 < 0$$

$$-10 \text{ mm} < f6 < 0 \text{ mm}$$

$$20 < V1 - V3$$

$$30 < V5 - V6$$

$$335° \text{ mm} < HFOV*f$$

$$5.0 \text{ mm} < f1234 < 12.5 \text{ mm}$$

$$5.50 \text{ mm} < f567 < 10.0 \text{ mm}$$

$$-1.0 < f/f6 < 0$$

In the above conditional expressions, HFOV is a horizontal field of view of the imaging lens system, L1S1ED is an effective diameter of an object-side surface of the first lens, TTL is a distance from the object-side surface of the first lens to an imaging plane, f1 is a focal length of the first lens distance, f2 is a focal length of the second lens, f3 is a focal length of the third lens, f6 is a focal length of the sixth lens, f1234 is a synthetic focal length of the first to fourth lenses, and f567 is a synthetic focal lengths of the fifth to seventh lenses, V1 is an Abbe number of the first lens, V3 is an Abbe number of the third lens, V5 is an Abbe number of the fifth lens, and V6 is an Abbe number of the sixth lens, and f is a focal length of the imaging lens system.

An imaging lens system according to the fourth aspect may be configured satisfy one or more conditional expressions, among the following conditional expressions. For example, the imaging lens system according to the fourth aspect may include seven lenses and may satisfy two or more conditional expressions, among the following conditional expressions. As another example, the imaging lens system according to the fourth aspect may include seven lenses, and may be configured to satisfy all of the following conditional expressions. As another example, the imaging lens system according to the fourth aspect may satisfy one or more conditional expressions, among the following conditional expressions, while having features of one of the imaging lens systems according to the first to third aspects described above.

$190° \leq FOV < 210°$ $14.0°/mm < HFOV/L1S1ED < 15.75°/mm$ $0.65 < L1S1ED/TTL < 0.75$ $0 < f1/f2 < 1.6$ $-9.0 \text{ mm} < f1 < -5.0 \text{ mm}$ $-1.2 < f1/f3 < -0.40$ $-10 \text{ mm} < f6 < 0 \text{ mm}$ $20 < V1-V3 < 26$ $30 < V5-V6 < 50$ $335° \text{ mm} < HFOV*f < 350° \text{ mm}$ $5.0 < f1/f < -3.0$ $-1.0 < f1/f4 < -0.1$ $-2.0 < f1/f7 < -1.0$ $-2.0 < f5/f6 < -1.0$ $-3.6 < (f5+f7)/f6 < -2.6$ $30 < |V5-V6| < 50$ $0.20 < ImgHT/TTL < 0.30$ $0.40 < SL/TTL < 0.50$ $8.0 < TTL/f < 10.0$ In the above conditional expressions, f4 is a focal length of the fourth lens, f5 is a focal length of the fifth lens, ImgHT is a height of the imaging plane, FOV is a field of view of the imaging lens system, and SL is a distance from a stop to the imaging plane.

An imaging lens system according to the fifth aspect may be configured to satisfy one or more conditional expressions, among the following conditional expressions. For example, the imaging lens system according to the fifth aspect may include seven lenses and may satisfy two or more conditional expressions, among the following conditional expressions. As another example, the imaging lens system according to the fifth aspect may include seven lenses and may be configured to satisfy all of the following conditional expressions. As another example, the imaging lens system according to the fifth aspect may satisfy one or more conditional expressions, among the following conditional expressions, while having features of one of the imaging lens systems according to the first to fourth aspects described above.

$2.0 < (R7+R8)/(R7-R8) < 8.0$ $-1.0 < (R8+R9)/(R8-R9) < 0$ $1.0 < (T2+T3)/D23 < 2.1$ $2.0 < (T3+T4)/D34 < 7.0$ $5.0 < (T4+T5)/D45 < 15$ $1.0 < T3/D34 < 4.0$ $2.0 < T4/D45 < 8.0$ $2.0 < D23/D67 < 13.0$ $0.3 < D45/D67 < 3.0$

In the above conditional expressions, R7 is a radius of curvature of an object-side surface of the fourth lens, R8 is a radius of curvature of an image-side surface of the fourth lens, R9 is a radius of curvature of an object-side surface of the fifth lens, T2 is a thickness of the second lens in a center of an optical axis, T3 is a thickness of the third lens in a center of the optical axis, T4 is a thickness of the fourth lens in a center of the optical axis, T5 is a thickness of the fifth lens in a center of the optical axis, D23 a distance from an image-side surface of the second lens to an object-side surface of the third lens, D34 is a distance from an image-side surface of the third lens to an object-side surface of the fourth lens, D45 is a distance from an image-side surface of the third lens to an object-side surface of the fifth lens, and D67 is a distance from an image-side surface of the sixth lens to an object-side surface of the seventh lens.

The imaging lens system according to the one or more examples may include one or more lenses having the following features, as necessary. For example, the imaging lens system according to the first aspect may include one of the first to seventh lenses according to the following features. As another example, the imaging lens systems according to the second to fifth aspects may include one or more of the first to seventh lenses according to the following features. However, the above-described imaging lens system may not necessarily include the lens having the following features. Hereinafter, features of the first to seventh lenses will be described.

The first lens has a refractive power. For example, the first lens may have a negative refractive power. The first lens may have a shape in which one surface is convex. For example, the first lens may have a convex object-side surface. The first lens includes a spherical surface. For example, both surfaces of the first lens may be spherical. The first lens may be formed of a material having high light transmissivity and excellent workability. For example, the first lens may be formed of a plastic material or a glass material. The first lens may be configured to have a predetermined refractive index. As an example, the refractive index of the first lens may be greater than 1.7. As a detailed example, the refractive index of the first lens may be greater than 1.72 to less than 1.84. The first lens may have a predetermined Abbe number. As an example, the Abbe number of the first lens may be 40 or more. As a detailed example, the Abbe number of the first lens may be greater than 40 to less than 60.

The second lens has a refractive power. For example, the second lens may have a negative refractive power. The second lens may have a shape in which one surface is concave. For example, the second lens may have a concave object-side surface or a concave image-side surface. The second lens may have an aspherical surface. For example, both surfaces of the second lens may be aspherical. The second lens may include an inflection point. For example, an inflection point may be formed on the object-side surface of the second lens. The second lens may be formed of a material having high light transmissivity and excellent workability. For example, the second lens may be formed of a plastic material or a glass material. The second lens may be configured to have a predetermined refractive index. For example, the refractive index of the second lens may be greater than 1.5. In an example, the refractive index of the second lens may have a value that is greater than 1.52 and less than 1.64. The second lens may have a predetermined Abbe number. For example, the Abbe number of the second lens may be equal to or greater than 50. In an example, the Abbe number of the second lens may have a value that is greater than 50 and less than 64.

The third lens has a refractive power. For example, the third lens may have a positive refractive power. The third lens may a have shape in which one surface is concave. As an example, the third lens may have a concave object-side surface. The third lens may have an aspherical surface. For example, both surfaces of the third lens may be aspherical. The third lens may be formed of a material having high light transmissivity and excellent workability. For example, the third lens may be formed of a plastic material or a glass material. The third lens may be configured to have a predetermined refractive index. For example, the refractive index of the third lens may be greater than 1.6 to less than 1.7. The third lens may have a predetermined Abbe number. For example, the Abbe number of the third lens may be greater than 20 to less than 40.

The fourth lens has a refractive power. For example, the fourth lens may have a positive refractive power. The fourth lens may have a shape in which one surface is concave. For example, the fourth lens may have a concave object-side surface. The fourth lens may have an aspherical surface. For example, both surfaces of the fourth lens may be aspherical. The fourth lens may be formed of a material having high light transmissivity and excellent workability. For example, the fourth lens may be formed of a plastic material or a glass material. The fourth lens may be configured to have a predetermined refractive index. For example, the refractive index of the fourth lens may be greater than 1.50 to less than 1.64. The fourth lens may have a predetermined Abbe number. For example, the Abbe number of the fourth lens may be greater than 50 to less than 70.

The fifth lens has a refractive power. For example, the fifth lens may have a positive refractive power. The fifth lens may have a surface in which one surface is convex. For example, the fifth lens may have a convex object-side surface or a convex image-side surface. The fifth lens may have an aspherical surface. For example, both surfaces of the fifth lens may be aspherical. The fifth lens may be formed of a material having high light transmissivity and excellent workability. For example, the fifth lens may be formed of a plastic material or a glass material. The fifth lens may be configured to have a predetermined refractive index. For example, the refractive index of the fifth lens may be greater than 1.4. As a detailed example, the refractive index of the fifth lens may be greater than 1.46 to less than 1.64. The fifth lens may have a predetermined Abbe number. For example, the Abbe number of the fifth lens may be 50 or more. As a detailed example, the Abbe number of the fifth lens may be greater than 50 to less than 72.

The sixth lens has a refractive power. For example, the sixth lens may have a negative refractive power. The sixth lens may have a shape in which one surface is concave. For example, the sixth lens may have a concave object-side surface. The sixth lens may have an aspherical surface. As an example, both surfaces of the sixth lens may be spherical. The sixth lens may be formed of a material having high light transmissivity and excellent workability. For example, the sixth lens may be formed of a plastic material or a glass material. The sixth lens may be configured to have a predetermined refractive index. For example, the refractive index of the sixth lens may be greater than 1.64 to less than 1.84. The sixth lens may have a predetermined Abbe number. For example, the Abbe number of the sixth lens may be greater than 18 to less than 30. The sixth lens may have a higher refractive power than other lenses. For example, the sixth lens may have a lowest absolute value, among absolute values of focal lengths of the first to seventh lenses.

The seventh lens has a refractive power. For example, the seventh lens may have a positive refractive power. The seventh lens may have a surface in which one surface is convex. For example, the seventh lens may have a convex object-side surface. The seventh lens may have an aspherical surface. For example, both surfaces of the seventh lens may be aspherical. An inflection point may be formed on the seventh lens. For example, an inflection point may be formed on at least one of an object-side surface and an image-side surface of the seventh lens. The seventh lens may be formed of a material having high light transmissivity and excellent workability. For example, the seventh lens may be formed of a plastic material or a glass material.

The seventh lens may be configured to have a predetermined refractive index. For example, the refractive index of the seventh lens may be greater than 1.50 to less than 1.64. The seventh lens may have a predetermined Abbe number. For example, the Abbe number of the seventh lens may be greater than 50 to less than 64.

An aspherical surface of the lens may be represented by Equation 1 below.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Ir^{20} \qquad \text{Equation 1}$$

In Equation 1, "c" is an inverse of a radius of a curvature of a respective lens, "k" is a conic constant, "r" is a distance from a certain point on an aspherical surface of the lens to an optical axis, "A to J" are aspheric constants, "Z" (or SAG) is a height from a certain point on an aspherical surface of the lens to an apex of the aspherical surface in an optical axis direction.

The imaging lens system according to the above-described aspect may further include a stop, a filter, and a cover glass. As an example, the imaging lens system may further include a stop disposed on the fourth lens and the fifth lens. The stop may be configured to adjust an intensity of light incident in the direction of the imaging plane. As another example, the imaging lens system may further include a filter and a cover glass disposed between the seventh lens and the image surface. The filter may be configured to block light having a specific wavelength, and the cover glass may be configured to block foreign objects, or the like, introduced in an upper surface direction. For reference, the filter described herein is configured to block infrared light but may be configured to block ultraviolet light, as necessary.

Hereinafter, detailed examples of the imaging lens system will be described with reference to the drawings.

An imaging lens system according to a first example will be described with reference to FIG. 1.

An imaging lens system 100 may include a first lens 110, a second lens 120, a third lens 130, a fourth lens 140, a fifth lens 150, a sixth lens 160, and a seventh lens 170.

A first lens 110 may have a negative refractive power, and may have a convex object-side surface and a convex image-side surface. The second lens 120 may have a negative refractive power, and may have a concave object-side surface and a concave image-side surface. The third lens 130 may have a positive refractive power, and may have a concave object-side surface and a convex image-side surface. The fourth lens 140 may have a positive refractive power, and may have a concave object-side surface and a convex image-side surface. The fifth lens 150 may have a positive refractive power, and may have a convex object-side surface and a convex image-side surface. The sixth lens 160 may have a negative refractive power, and may have a concave object-side surface and a concave image-side surface. The seventh lens 170 may have a positive refractive power, and may have a convex object-side surface and a convex image-side surface.

The imaging lens system 100 may include a lens having an inflection point. For example, an inflection point may be formed on the object-side surface of the second lens 120 in the imaging lens system 100 according to the present example. However, a lens on which an inflection point is formed is not limited to the second lens 120.

The imaging lens system 100 may further include a stop ST, a filter IF, a cover glass CG, and an imaging plane IP. The stop ST may be disposed between the fourth lens 140 and the fifth lens 150, and the filter IF and the cover glass CG may be sequentially disposed between the seventh lens 170 and the imaging plane IP. The imaging plane IP may be formed on one surface of an image sensor IS of a camera module, or inside the image sensor IS.

Figure 2:
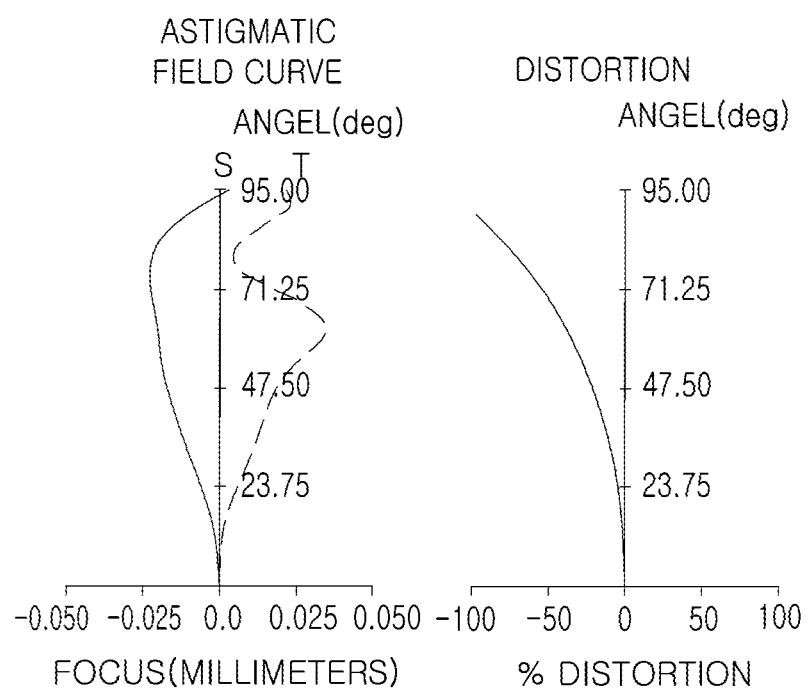
FIG. 2 illustrates an aberration curve of the example imaging lens system illustrated in FIG. 1.

Tables 1 and 2 below illustrate lens characteristics and aspherical values of the imaging lens system according to the present example, and FIG. 2 is an aberration curve of the imaging lens system according to the present example.

TABLE 1

| Surface No. | Configuration | Radius of Curvature | Thickness/ Distance | Refractive Index | Abbe Number | Effective Radius |
|---|---|---|---|---|---|---|
| S1 | First Lens | 12.832 | 0.800 | 1.776 | 49.6 | 6.060 |
| S2 | | 4.000 | 1.729 | | | 3.570 |
| S3 | Second Lens | −38.524 | 0.800 | 1.623 | 60.3 | 3.270 |
| S4 | | 4.426 | 1.918 | | | 2.233 |
| S5 | Third Lens | −4.155 | 1.689 | 1.626 | 25.9 | 1.887 |
| S6 | | −3.009 | 0.530 | | | 1.719 |
| S7 | Fourth Lens | −4.727 | 1.493 | 1.511 | 68.1 | 1.595 |
| S8 | | −2.695 | 0.110 | | | 1.648 |
| S9 | Stop | Infinity | 0.245 | | | 1.519 |
| S10 | Fifth Lens | 3.642 | 1.931 | 1.511 | 55.1 | 1.804 |
| S11 | | −3.300 | 0.192 | | | 1.827 |
| S12 | Sixth Lens | −3.159 | 0.800 | 1.816 | 22.8 | 1.770 |
| S13 | | 5.134 | 0.152 | | | 1.993 |
| S14 | Seventh Lens | 3.903 | 2.163 | 1.623 | 60.3 | 2.530 |
| S15 | | −6.318 | 0.600 | | | 2.744 |
| S16 | Filter | Infinity | 0.400 | 1.519 | 64.2 | 2.825 |
| S17 | | Infinity | 0.500 | | | 2.844 |
| S18 | Cover Glass | Infinity | 0.400 | 1.500 | 67.0 | 2.881 |
| S19 | | Infinity | 0.548 | | | 2.901 |
| S20 | Imaging Plane | Infinity | 0.000 | | | 2.970 |

TABLE 2

| Surface No. | S3 | S4 | S5 | S6 | S7 | S8 |
|---|---|---|---|---|---|---|
| K | 0.0000E+00 | 0.0000E+00 | 0.0000E+00 | 0.0000E+00 | 0.0000E+00 | 0.0000E+00 |
| A | 1.5267E−02 | 2.3233E−02 | −9.8592E−03 | 1.2897E−02 | 9.7541E−03 | −4.0761E−03 |
| B | −6.8019E−04 | 8.3037E−04 | 9.6676E−04 | 1.1779E−03 | −3.3940E−03 | 2.3874E−03 |
| C | −2.2476E−05 | 6.4753E−04 | 1.7915E−05 | −2.6412E−04 | 3.7675E−04 | −8.9545E−04 |
| D | 1.3313E−06 | −2.0081E−04 | 0.0000E+00 | 1.2287E−04 | −2.2180E−04 | 8.6378E−05 |
| Surface No. | S10 | S11 | S12 | S13 | S14 | S15 |
| K | 0.0000E+00 | 0.0000E+00 | 0.0000E+00 | 0.0000E+00 | −1.6497E+00 | −1.0193E+01 |
| A | −5.0848E−03 | −2.4222E−02 | −1.6512E−02 | 1.1937E−03 | −4.1623E−03 | −5.3531E−03 |
| B | 3.5525E−03 | 2.0169E−02 | 1.4717E−02 | −2.1390E−03 | 6.9459E−04 | 3.5459E−03 |
| C | −1.0607E−03 | −6.1140E−03 | −4.5133E−03 | 8.2537E−04 | −1.2340E−04 | −6.5628E−04 |
| D | 1.1749E−04 | 6.8624E−04 | 5.1662E−04 | −8.5193E−05 | 8.9833E−06 | 3.5012E−05 |

Figure 3:
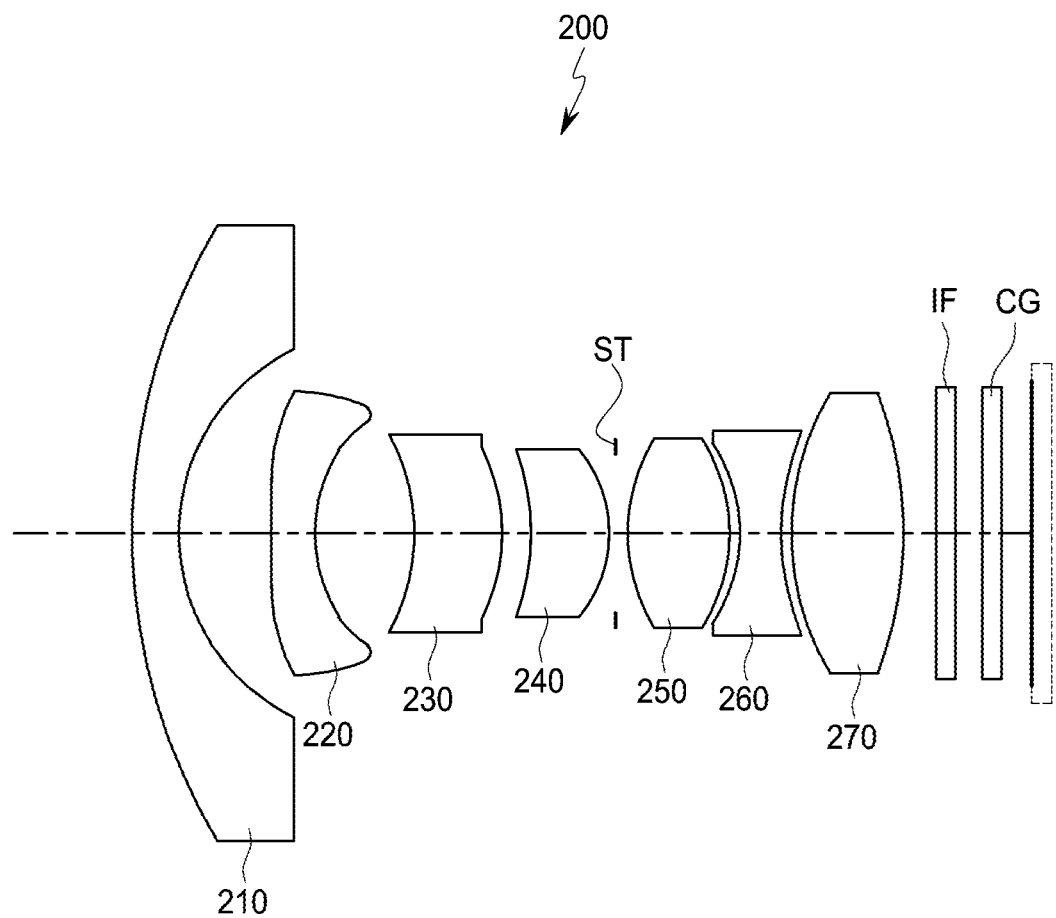
FIG. 3 illustrates a configuration of an example imaging lens system according to a second example.

An imaging lens system according to a second example will be described with reference to FIG. 3.

The imaging lens system 200 may include a first lens 210, a second lens 220, a third lens 230, a fourth lens 240, a fifth lens 250, a sixth lens 260, and a seventh lens 270.

The first lens 210 may have a negative refractive power, and may have a convex object-side surface and a concave image-side surface. The second lens 220 may have a negative refractive power, and may have a convex object-side surface and a concave image-side surface. The third lens 230 may have positive refractive power, and may have a concave object-side surface and a convex image-side surface. The fourth lens 240 may have a positive refractive power, and may have a concave object-side surface and a convex image-side surface. The fifth lens 250 may have a positive refractive power, and may have a convex object-side surface and a convex image-side surface. The sixth lens 260 may have a negative refractive power, and may have a concave object-side surface and a concave image-side surface. The seventh lens 270 may have a positive refractive power, and may have a convex object-side surface and a convex image-side surface.

The imaging lens system 200 may include a lens having an inflection point. For example, an inflection point may be formed on the object-side surface of the second lens 220 in the imaging lens system 200 according to the present example. However, a lens in which an inflection point is formed is not limited to the second lens 220.

The imaging lens system 200 may further include a stop ST, a filter IF, a cover glass CG, and an imaging plane IP. The stop ST may be disposed between the third lens 230 and the fourth lens 240, and the filter IF and the cover glass CG may be sequentially disposed between the seventh lens 270 and the imaging plane IP. The imaging plane IP may be formed on one surface of an image sensor IS of a camera module, or inside the image sensor IS.

Figure 4:
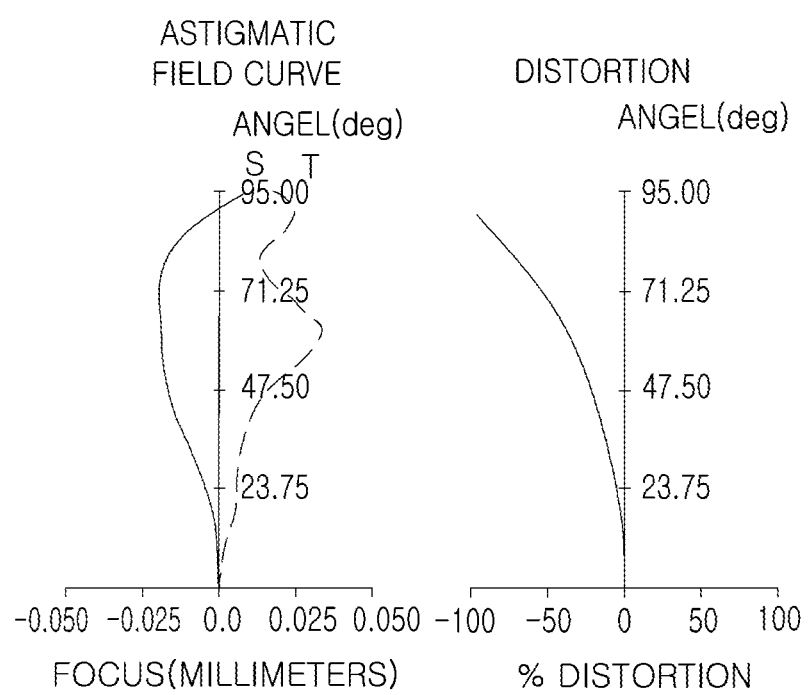
FIG. 4 illustrates an aberration curve of the example imaging lens system illustrated in FIG. 3.

Tables 3 and 4 below illustrate lens characteristics and aspherical values of the imaging lens system according to the present example, and FIG. 4 is an aberration curve of the imaging lens system according to the present example.

TABLE 3

| Surface No. | Configuration | Radius of Curvature | Thickness/ Distance | Refractive Index | Abbe Number | Effective Radius |
|---|---|---|---|---|---|---|
| S1 | First Lens | 12.458 | 0.800 | 1.776 | 49.6 | 6.102 |
| S2 | | 4.143 | 1.673 | | | 3.658 |
| S3 | Second Lens | 188.860 | 0.800 | 1.623 | 60.3 | 3.327 |
| S4 | | 3.610 | 1.998 | | | 2.219 |
| S5 | Third Lens | −4.170 | 1.638 | 1.626 | 25.9 | 1.973 |
| S6 | | −3.000 | 0.604 | | | 1.818 |
| S7 | Fourth Lens | −4.735 | 1.503 | 1.517 | 67.6 | 1.615 |
| S8 | | −2.733 | 0.110 | | | 1.636 |
| S9 | Stop | Infinity | 0.164 | | | 1.515 |
| S10 | Fifth Lens | 3.547 | 1.960 | 1.504 | 56.3 | 1.769 |
| S11 | | −3.300 | 0.194 | | | 1.795 |
| S12 | Sixth Lens | −3.191 | 0.800 | 1.816 | 22.8 | 1.740 |
| S13 | | 5.224 | 0.160 | | | 1.961 |
| S14 | Seventh Lens | 3.900 | 2.180 | 1.623 | 60.3 | 2.548 |
| S15 | | −6.418 | 0.600 | | | 2.790 |
| S16 | Filter | Infinity | 0.400 | 1.519 | 64.2 | 2.858 |
| S17 | | Infinity | 0.500 | | | 2.873 |
| S18 | Cover Glass | Infinity | 0.400 | 1.500 | 67.0 | 2.902 |
| S19 | | Infinity | 0.516 | | | 2.917 |
| S20 | Imaging Plane | Infinity | 0.000 | | | 2.951 |

TABLE 4

| Surface No. | S3 | S4 | S5 | S6 | S7 | S8 |
|---|---|---|---|---|---|---|
| K | 0.0000E+00 | 0.0000E+00 | 0.0000E+00 | 0.0000E+00 | 0.0000E+00 | 0.0000E+00 |
| A | 1.3139E−02 | 2.2534E−02 | −7.4457E−03 | 1.4067E−02 | 1.1580E−02 | −4.0971E−03 |
| B | −4.6403E−04 | 4.4760E−04 | 8.4544E−04 | 3.1540E−04 | −4.7383E−03 | 2.6901E−03 |
| C | −4.2017E−05 | 1.0026E−03 | −1.0150E−05 | 1.1010E−05 | 7.7530E−04 | −1.0179E−03 |
| D | 2.0748E−06 | −2.6068E−04 | 0.0000E+00 | 5.8665E−05 | −2.8293E−04 | 1.0317E−04 |

| Surface No. | S10 | S11 | S12 | S13 | S14 | S15 |
|---|---|---|---|---|---|---|
| K | 0.0000E+00 | 0.0000E+00 | 0.0000E+00 | 0.0000E+00 | −1.7629E+00 | −7.3794E+00 |
| A | −5.9569E−03 | −2.4574E−02 | −1.5702E−02 | 1.5776E−03 | −5.6379E−03 | −5.0998E−03 |
| B | 4.0665E−03 | 2.0740E−02 | 1.4283E−02 | −2.0422E−03 | 1.1851E−03 | 3.0960E−03 |
| C | −1.1579E−03 | −6.3321E−03 | −4.6558E−03 | 7.4109E−04 | −1.8062E−04 | −5.4106E−04 |
| D | 1.2596E−04 | 7.1799E−04 | 5.6682E−04 | −7.0181E−05 | 1.0284E−05 | 2.6293E−05 |

Figure 5:
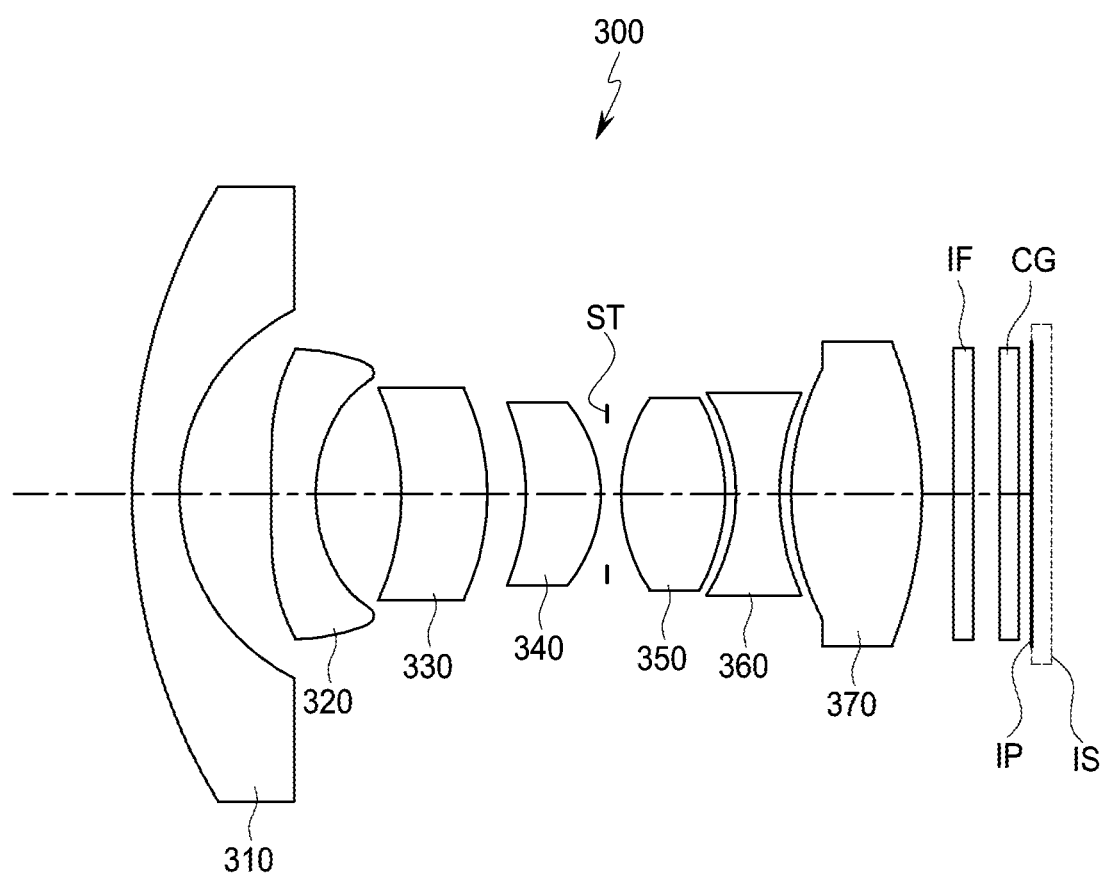
FIG. 5 illustrates a configuration of an example imaging lens system according to a third example.

An imaging lens system according to a third example will be described with reference to FIG. 5.

The imaging lens system 300 may include a first lens 310, a second lens 320, a third lens 330, a fourth lens 340, a fifth lens 350, a sixth lens 360, and a seventh lens 370.

The first lens 310 may have a negative refractive power, and may have a convex object-side surface a concave image-side surface. The second lens 320 may have a negative refractive power, and may have a convex object-side surface and a concave image-side surface. The third lens 330 may have a positive refractive power, and may have a concave object-side surface and a convex image-side surface. The fourth lens 340 may have a positive refractive power, and may have a concave object-side surface and a convex image-side surface. The fifth lens 350 may have a positive refractive power and may have a convex object-side surface and a convex image-side surface. The sixth lens 360 may have a negative refractive power, and may have a concave object-side surface and a concave image-side surface. The seventh lens 370 may have a positive refractive power and may have a convex object-side surface and a convex image-side surface.

The imaging lens system 300 may include a lens having an inflection point. For example, an inflection point may be formed on the object-side surface of the second lens 320 in the imaging lens system 300 according to the present example. However, the lens in which the inflection point is formed is not limited to the second lens 320.

The imaging lens system 300 may further include a stop ST, a filter IF, a cover glass CG, and an imaging plane IP. The stop ST may be disposed between the third lens 330 and the fourth lens 340, and the filter IF and the cover glass CG may be sequentially disposed between the seventh lens 370 and the imaging plane IP. The imaging plane IP may be formed on one surface of an image sensor IS of a camera module, or inside the image sensor IS.

Figure 6:
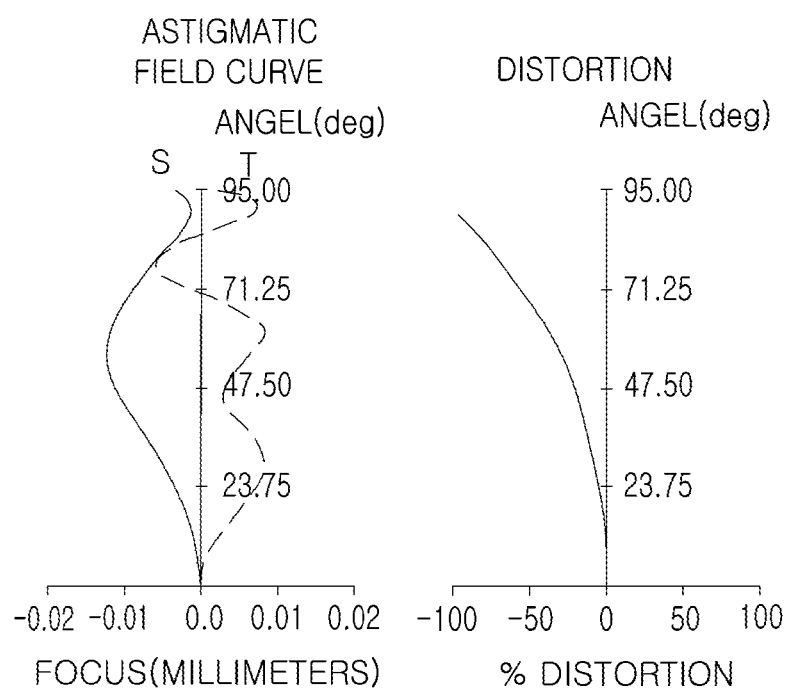
FIG. 6 illustrates an aberration curve of the example imaging lens system illustrated in FIG. 5.

Tables 5 and 6 below illustrate lens characteristics and aspherical values of the imaging lens system according to the present example, and FIG. 6 is an aberration curve of the imaging lens system according to the present example.

TABLE 5

| Surface No. | Configuration | Radius of Curvature | Thickness/ Distance | Refractive Index | Abbe Number | Effective Radius |
|---|---|---|---|---|---|---|
| S1 | First Lens | 13.123 | 0.800 | 1.776 | 49.6 | 5.864 |
| S2 | | 3.910 | 1.746 | | | 3.456 |
| S3 | Second Lens | 388.114 | 0.800 | 1.623 | 60.3 | 3.170 |
| S4 | | 3.900 | 1.639 | | | 2.177 |
| S5 | Third Lens | −4.805 | 1.651 | 1.613 | 26.9 | 2.109 |
| S6 | | −3.300 | 0.743 | | | 1.942 |
| S7 | Fourth Lens | −4.880 | 1.439 | 1.530 | 46.3 | 1.806 |
| S8 | | −2.861 | 0.110 | | | 1.956 |
| S9 | Stop | Infinity | 0.272 | | | 1.494 |
| S10 | Fifth Lens | 3.638 | 2.001 | 1.503 | 56.4 | 1.860 |
| S11 | | −3.400 | 0.196 | | | 1.872 |
| S12 | Sixth Lens | −3.393 | 0.800 | 1.674 | 19.7 | 1.819 |
| S13 | | 4.894 | 0.272 | | | 1.986 |
| S14 | Seventh Lens | 4.130 | 2.432 | 1.623 | 60.3 | 2.485 |
| S15 | | −9.750 | 0.600 | | | 2.868 |
| S16 | Filter | Infinity | 0.400 | 1.519 | 64.2 | 2.903 |
| S17 | | Infinity | 0.500 | | | 2.911 |
| S18 | Cover Glass | Infinity | 0.400 | 1.500 | 67.0 | 2.927 |
| S19 | | Infinity | 0.200 | | | 2.935 |
| S20 | Imaging Plane | Infinity | 0.000 | | | 2.950 |

TABLE 6

| Surface No. | S3 | S4 | S5 | S6 | S7 | S8 |
|---|---|---|---|---|---|---|
| K | 0.0000E+00 | 0.0000E+00 | 0.0000E+00 | 0.0000E+00 | 0.0000E+00 | 0.0000E+00 |
| A | 1.5092E−02 | 2.3267E−02 | −2.7332E−03 | 1.3830E−02 | 1.0028E−02 | −2.4315E−03 |
| B | −1.2069E−03 | 9.9777E−04 | 1.0155E−03 | 1.6110E−05 | −3.9738E−03 | 1.3333E−03 |
| C | 1.1994E−05 | −1.1596E−04 | −1.1108E−04 | 1.3238E−04 | 5.9993E−04 | −5.1714E−04 |
| D | 9.7747E−07 | −8.0312E−05 | 0.0000E+00 | 1.1462E−05 | −1.9428E−04 | 4.2761E−05 |

| Surface No. | S10 | S11 | S12 | S13 | S14 | S15 |
|---|---|---|---|---|---|---|
| K | 0.0000E+00 | 0.0000E+00 | 0.0000E+00 | 0.0000E+00 | −1.9132E+00 | −5.2419E+00 |
| A | −4.7141E−03 | −2.0003E−02 | −1.6260E−02 | −4.4228E−03 | −9.8530E−03 | −1.0965E−03 |
| B | 2.7249E−03 | 1.7069E−02 | 1.6150E−02 | 3.5464E−03 | 2.5914E−03 | 1.0610E−03 |
| C | −7.6289E−04 | −5.3855E−03 | −5.7360E−03 | −6.0947E−04 | −3.2254E−04 | −1.9557E−04 |
| D | 9.7502E−05 | 6.4342E−04 | 7.1246E−04 | 4.3616E−05 | 1.3340E−05 | 6.6678E−06 |

Figure 7:
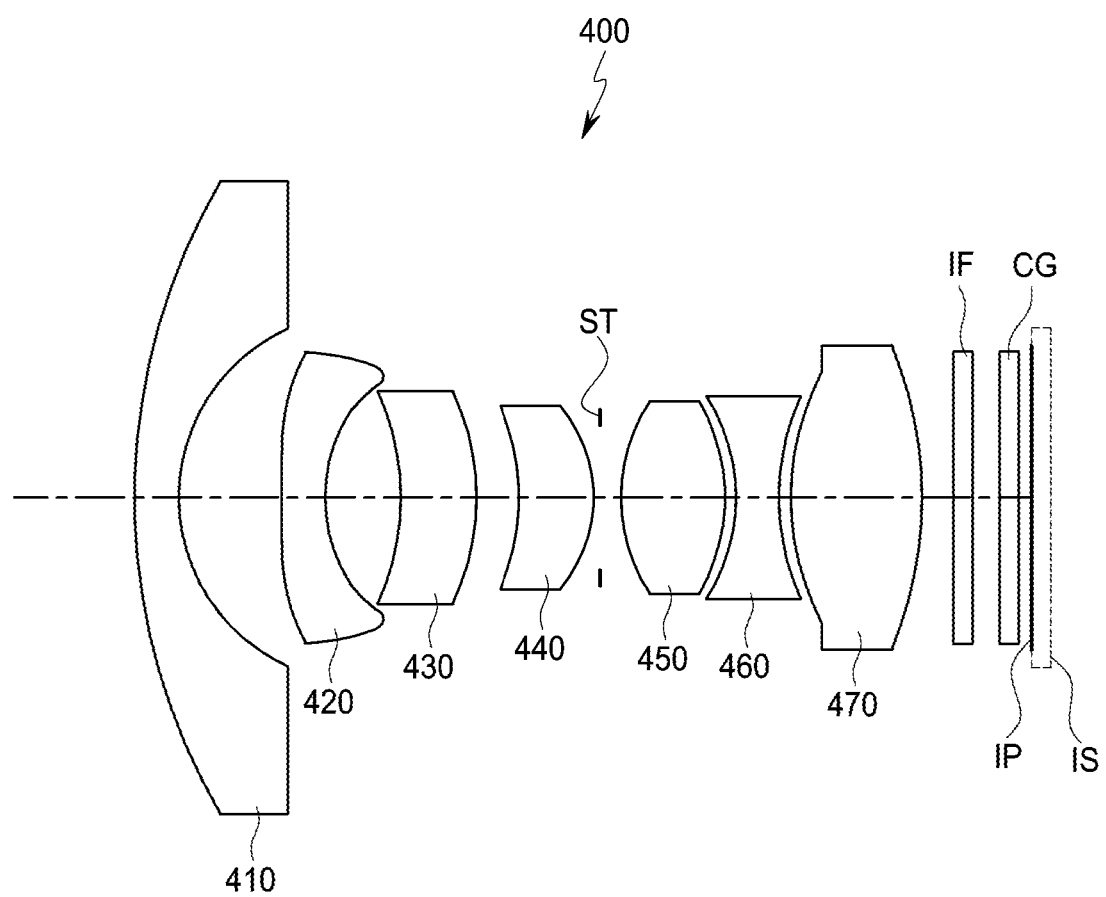
FIG. 7 illustrates a configuration of an example imaging lens system according to a fourth example.

An imaging lens system according to a fourth embodiment will be described with reference to FIG. 7.

The imaging lens system 400 may include a first lens 410, a second lens 420, a third lens 430, a fourth lens 440, a fifth lens 450, a sixth lens 460, and a seventh lens 470.

The first lens 410 may have a negative refractive power, and may have a convex object-side surface and a concave image-side surface. The second lens 420 may have a negative refractive power, and may have a concave object-side surface and a concave image-side surface. The third lens 430 may have a positive refractive power, and may have a concave object-side surface and a convex image-side surface. The fourth lens 440 may have a positive refractive power, and may have a concave object-side surface and a convex image-side surface. The fifth lens 450 may have a positive refractive power, and may have a convex object-side surface and a convex image-side surface. The sixth lens 460 may have a negative refractive power, and may have a concave object-side surface and a concave image-side surface. The seventh lens 470 may have positive refractive power, and may have a convex object-side surface and a convex image-side surface.

The imaging lens system 400 may include a lens having an inflection point. For example, an inflection point may be formed on the object-side surface of the second lens 420 in the imaging lens system 400 according to the present example. However, the lens in which the inflection point is formed is not limited to the second lens 420.

The imaging lens system 400 may further include a stop ST, a filter IF, a cover glass CG, and an imaging plane IP. The stop ST may be disposed between the fourth lens 440 and the fifth lens 450, and the filter IF and the cover glass CG may be sequentially disposed between the seventh lens 470 and the imaging plane IP. The imaging plane IP may be formed on one surface of an image sensor IS of a camera module, or inside the image sensor IS.

Figure 8:
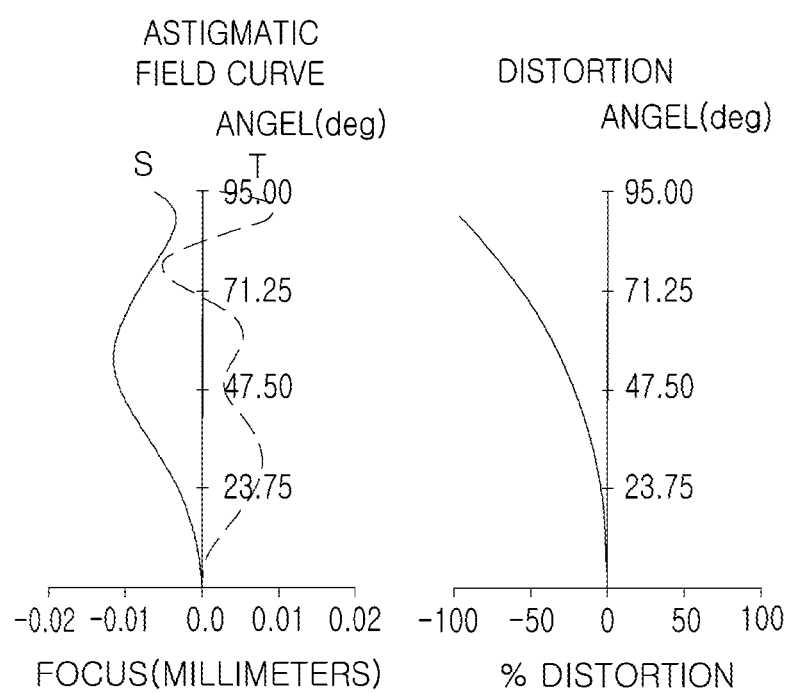
FIG. 8 illustrates an aberration curve of the example imaging lens system illustrated in FIG. 7.

Tables 7 and 8 below illustrate lens characteristics and aspherical values of the imaging lens system according to the present example, and FIG. 8 is an aberration curve of the imaging lens system according to the present example.

TABLE 7

| Surface No. | Configuration | Radius of Curvature | Thickness/ Distance | Refractive Index | Abbe Number | Effective Radius |
|---|---|---|---|---|---|---|
| S1 | First Lens | 12.578 | 0.845 | 1.776 | 49.6 | 5.807 |
| S2 | | 3.671 | 1.943 | | | 3.311 |
| S3 | Second Lens | −59.770 | 0.857 | 1.623 | 60.3 | 3.031 |
| S4 | | 4.112 | 1.370 | | | 2.060 |
| S5 | Third Lens | −5.589 | 1.522 | 1.613 | 26.9 | 2.003 |
| S6 | | −3.300 | 0.775 | | | 1.919 |
| S7 | Fourth Lens | −4.479 | 1.411 | 1.621 | 63.9 | 1.804 |
| S8 | | −2.934 | 0.115 | | | 1.986 |
| S9 | Stop | Infinity | 0.459 | | | 1.481 |
| S10 | Fifth Lens | 3.706 | 2.003 | 1.503 | 56.4 | 1.876 |
| S11 | | −3.400 | 0.201 | | | 1.884 |
| S12 | Sixth Lens | −3.373 | 0.800 | 1.666 | 20.8 | 1.833 |
| S13 | | 5.095 | 0.226 | | | 2.036 |
| S14 | Seventh Lens | 4.338 | 2.373 | 1.623 | 60.3 | 2.518 |
| S15 | | −8.984 | 0.600 | | | 2.912 |
| S16 | Filter | Infinity | 0.400 | 1.519 | 64.2 | 2.927 |
| S17 | | Infinity | 0.500 | | | 2.930 |
| S18 | Cover Glass | Infinity | 0.400 | 1.500 | 67.0 | 2.936 |
| S19 | | Infinity | 0.200 | | | 2.939 |
| S20 | Imaging Plane | Infinity | 0.000 | | | 2.951 |

TABLE 8

| Surface No. | S3 | S4 | S5 | S6 | S7 | S8 |
|---|---|---|---|---|---|---|
| K | 0.0000E+00 | 0.0000E+00 | 0.0000E+00 | 0.0000E+00 | 0.0000E+00 | 0.0000E+00 |
| A | 1.3992E−02 | 2.2404E−02 | −2.9662E−03 | 1.3851E−02 | 9.6007E−03 | −7.2238E−04 |
| B | −1.1006E−03 | 9.6540E−04 | 1.8313E−03 | 3.3025E−04 | −4.0362E−03 | −7.0245E−05 |
| C | −9.6373E−06 | 5.0835E−05 | −3.2202E−04 | −9.0142E−05 | 5.0030E−04 | −6.7224E−05 |
| D | 2.4511E−06 | −1.1659E−04 | 0.0000E+00 | 4.1842E−05 | −1.3487E−04 | −4.3474E−06 |

| Surface No. | S10 | S11 | S12 | S13 | S14 | S15 |
|---|---|---|---|---|---|---|
| K | 0.0000E+00 | 0.0000E+00 | 0.0000E+00 | 0.0000E+00 | −1.7766E+00 | −6.7029E+00 |
| A | −3.4698E−03 | −1.6692E−02 | −1.3794E−02 | −5.8793E−03 | −1.1092E−02 | −5.0199E−04 |
| B | 1.4497E−03 | 1.3809E−02 | 1.3642E−02 | 4.4728E−03 | 3.3618E−03 | 1.1036E−03 |
| C | −3.8434E−04 | −4.3015E−03 | −4.7703E−03 | −7.9598E−04 | −4.6675E−04 | −2.2599E−04 |
| D | 6.2085E−05 | 5.1751E−04 | 5.6995E−04 | 5.2029E−05 | 2.1634E−05 | 8.1714E−06 |

Figure 9:
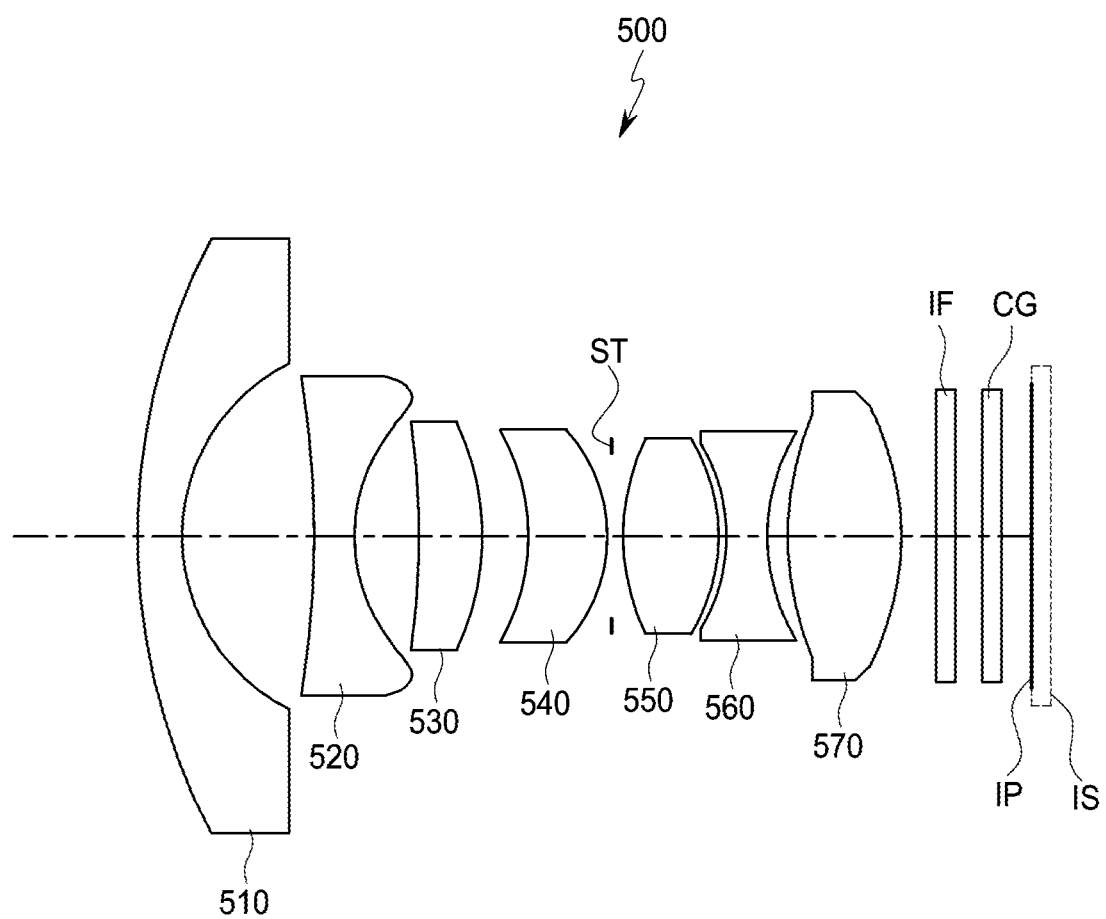
FIG. 9 illustrates a configuration of an example imaging lens system according to a fifth example.

An imaging lens system according to a fifth example will be described with reference to FIG. 9.

The imaging lens system 500 may include a first lens 510, a second lens 520, a third lens 530, a fourth lens 540, a fifth lens 550, a sixth lens 560, and a seventh lens 570.

The first lens 510 may have a negative refractive power, and may have a convex object-side surface and a concave image-side surface. The second lens 520 may have a negative refractive power, and may have a concave object-side surface and a concave image-side surface. The third lens 530 may have a positive refractive power, and may have a concave object-side surface and a convex image-side surface. The fourth lens 540 may have positive refractive power, and may have a concave object-side surface and a convex image-side surface. The fifth lens 550 may have positive refractive power, and may have a convex object-side surface and a convex image-side surface. The sixth lens 560 may have a negative refractive power, and may have a concave object-side surface and a concave image-side surface. The seventh lens 570 may have a positive refractive power and may have a convex object-side surface and a convex image-side surface.

The imaging lens system 500 may include a lens having an inflection point. For example, an inflection point may be formed on the image-side surface of the second lens 520 in the imaging lens system 500 according to the present example. However, a lens in which an inflection point is formed is not limited to the second lens 520.

The imaging lens system 500 may further include a stop ST, a filter IF, a cover glass CG, and an imaging plane IP. The stop ST may be disposed between the fourth lens 540 and the fifth lens 550, and the filter IF and the cover glass CG may be sequentially disposed between the seventh lens 570 and the imaging plane IP. The imaging plane IP may be formed on one surface of an image sensor IS of a camera module, or inside the image sensor IS.

Figure 10:
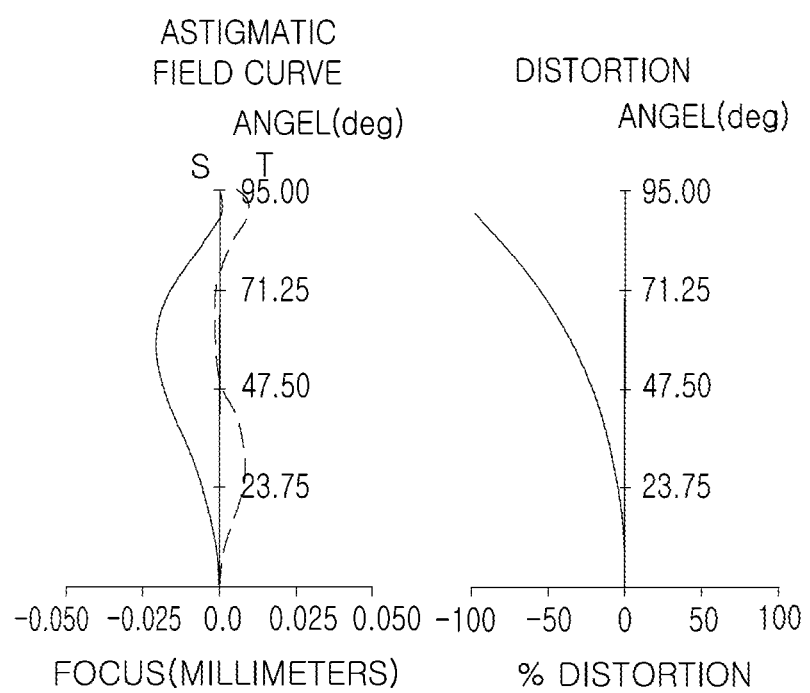
FIG. 10 illustrates an aberration curve of the example imaging lens system illustrated in FIG. 9.

Tables 9 and 10 below illustrate lens characteristics and aspherical values of the imaging lens system according to the present example, and FIG. 10 is an aberration curve of the imaging lens system according to the present example.

TABLE 9

| Surface No. | Configuration | Radius of Curvature | Thickness/ Distance | Refractive Index | Abbe Number | Effective Radius |
|---|---|---|---|---|---|---|
| S1 | First Lens | 12.551 | 0.800 | 1.776 | 49.6 | 5.737 |
| S2 | | 3.596 | 2.520 | | | 3.273 |
| S3 | Second Lens | −8.744 | 0.800 | 1.539 | 56.0 | 3.032 |
| S4 | | 4.652 | 1.189 | | | 2.202 |
| S5 | Third Lens | −13.895 | 1.210 | 1.613 | 26.9 | 2.160 |
| S6 | | −3.759 | 0.846 | | | 2.110 |
| S7 | Fourth Lens | −4.566 | 1.551 | 1.621 | 63.9 | 1.917 |
| S8 | | −3.026 | 0.110 | | | 2.074 |
| S9 | Stop | Infinity | 0.194 | | | 1.467 |
| S10 | Fifth Lens | 3.879 | 1.875 | 1.539 | 56.0 | 1.755 |
| S11 | | −3.155 | 0.110 | | | 1.803 |
| S12 | Sixth Lens | −3.487 | 0.800 | 1.646 | 23.5 | 1.752 |
| S13 | | 3.540 | 0.351 | | | 1.981 |
| S14 | Seventh Lens | 4.627 | 2.138 | 1.539 | 56.0 | 2.273 |
| S15 | | −4.643 | 0.600 | | | 2.608 |
| S16 | Filter | Infinity | 0.400 | 1.519 | 64.2 | 2.764 |
| S17 | | Infinity | 0.500 | | | 2.795 |
| S18 | Cover Glass | Infinity | 0.400 | 1.500 | 67.0 | 2.854 |
| S19 | | Infinity | 0.605 | | | 2.886 |
| S20 | Imaging Plane | Infinity | 0.000 | | | 2.957 |

TABLE 10

| Surface No. | S3 | S4 | S5 | S6 | S7 | S8 |
|---|---|---|---|---|---|---|
| K | 0.0000E+00 | 0.0000E+00 | 0.0000E+00 | 0.0000E+00 | 0.0000E+00 | 0.0000E+00 |
| A | 1.6607E−02 | 2.2258E−02 | −3.1870E−03 | 1.0008E−02 | 1.0492E−02 | −5.9628E−04 |
| B | −2.6560E−03 | −2.2668E−04 | 2.9622E−03 | 1.3047E−03 | −3.9427E−03 | −2.1663E−04 |
| C | 1.8046E−04 | −3.1969E−04 | −4.7754E−04 | −4.1102E−04 | 6.6218E−05 | 3.4241E−05 |
| D | −4.5935E−06 | 0.0000E+00 | 0.0000E+00 | 4.3019E−05 | 6.7837E−06 | 0.0000E+00 |

| Surface No. | S10 | S11 | S12 | S13 | S14 | S15 |
|---|---|---|---|---|---|---|
| K | 0.0000E+00 | 0.0000E+00 | 0.0000E+00 | 0.0000E+00 | −1.3809E+00 | −3.5799E+00 |
| A | −5.8152E−03 | −8.7467E−03 | −9.3447E−03 | −5.4431E−03 | −5.3928E−03 | 1.1199E−03 |
| B | 4.8984E−04 | 1.0508E−02 | 1.0221E−02 | 2.0035E−03 | 1.4448E−03 | 3.5597E−04 |
| C | 3.0715E−04 | −2.7726E−03 | −2.9155E−03 | −3.8528E−04 | −2.3730E−04 | −1.1135E−04 |
| D | −4.8946E−05 | 2.0467E−04 | 1.2953E−04 | 1.2886E−05 | 1.0567E−05 | −1.3150E−06 |

Figure 11:
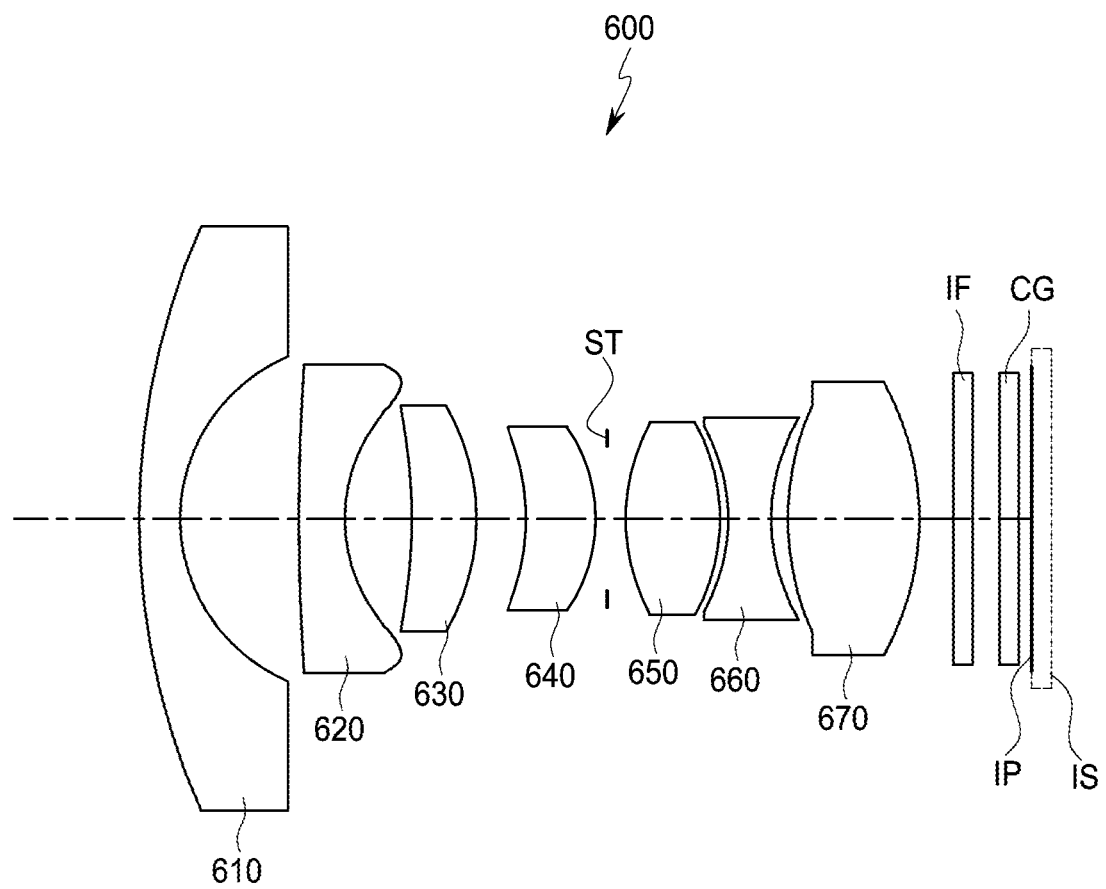
FIG. 11 illustrates a configuration of an example imaging lens system according to a sixth example.

An imaging lens system according to a sixth example will be described with reference to FIG. 11.

The imaging lens system 600 may include a first lens 610, a second lens 620, a third lens 630, a fourth lens 640, a fifth lens 650, a sixth lens 660, and a seventh lens 670.

The first lens 610 may have a negative refractive power, and may have a convex object-side surface and a concave image-side surface. The second lens 620 may have a negative refractive power, and may have a concave object-side surface and a concave image-side surface. The third lens 630 may have a positive refractive power, and may have a concave object-side surface and a convex image-side surface. The fourth lens 640 may have a positive refractive power, and may have a concave object-side surface and a convex image-side surface. The fifth lens 650 may have a positive refractive power, and may have a convex object-side surface and a convex image-side surface. The sixth lens 660 may have a negative refractive power, and may have a concave object-side surface and a concave image-side surface. The seventh lens 670 may have a positive refractive power and may have a convex object-side surface and a convex image-side surface.

The imaging lens system 600 may include a lens having an inflection point. For example, an inflection point may be formed on the object-side surface of the second lens 620 in the imaging lens system 600 according to the present example. However, a lens in which an inflection point is formed is not limited to the second lens 620.

The imaging lens system 600 may further include a stop ST, a filter IF, a cover glass CG, and an imaging plane IP. The stop ST may be disposed between the fourth lens 640 and the fifth lens 650, and the filter IF and the cover glass CG may be sequentially disposed between the seventh lens 670 and the imaging plane IP. The imaging plane IP may be formed on one surface of an image sensor IS of a camera module, or inside the image sensor IS.

Figure 12:
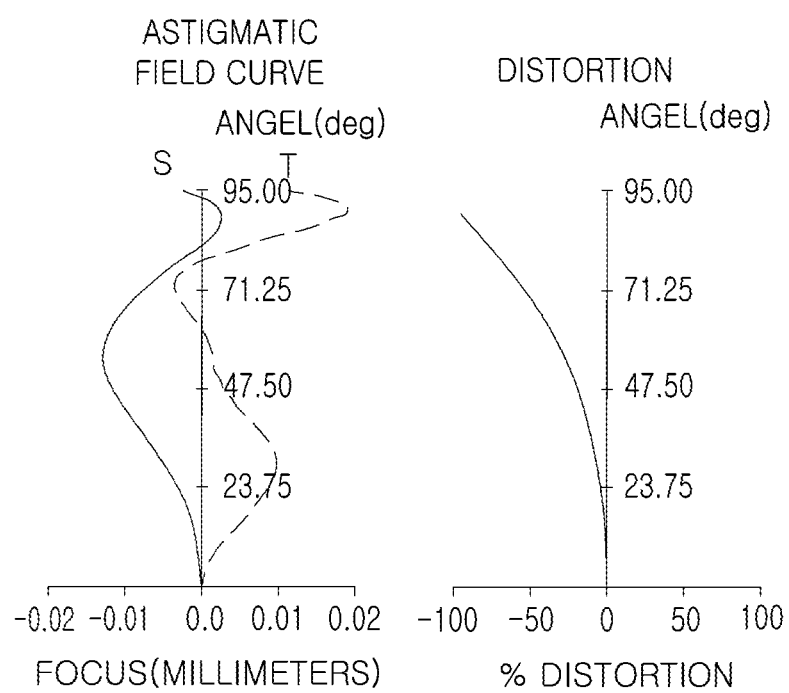
FIG. 12 illustrates an aberration curve of the example imaging lens system illustrated in FIG. 11.

Tables 11 and 12 below illustrate lens characteristics and aspheric values of the imaging lens system according to the present example, and FIG. 12 is an aberration curve of the imaging lens system according to the present example.

TABLE 11

| Surface No. | Configuration | Radius of Curvature | Thickness/ Distance | Refractive Index | Abbe Number | Effective Radius |
|---|---|---|---|---|---|---|
| S1 | First Lens | 14.843 | 0.800 | 1.776 | 49.6 | 5.729 |
| S2 |  | 3.547 | 2.267 |  |  | 3.233 |
| S3 | Second Lens | −14.486 | 0.800 | 1.539 | 56.0 | 3.034 |
| S4 |  | 4.450 | 1.311 |  |  | 2.231 |
| S5 | Third Lens | −9.634 | 1.214 | 1.613 | 26.9 | 2.181 |
| S6 |  | −3.379 | 0.980 |  |  | 2.137 |
| S7 | Fourth Lens | −4.037 | 1.341 | 1.558 | 43.0 | 1.810 |
| S8 |  | −3.026 | 0.110 |  |  | 1.871 |
| S9 | Stop | Infinity | 0.439 |  |  | 1.471 |
| S10 | Fifth Lens | 4.196 | 1.815 | 1.621 | 63.9 | 1.829 |
| S11 |  | −3.349 | 0.148 |  |  | 1.872 |
| S12 | Sixth Lens | −3.819 | 0.800 | 1.655 | 21.0 | 1.794 |
| S13 |  | 3.983 | 0.341 |  |  | 1.978 |
| S14 | Seventh Lens | 5.251 | 2.456 | 1.539 | 56.0 | 2.233 |
| S15 |  | −5.812 | 0.600 |  |  | 2.686 |
| S16 | Filter | Infinity | 0.400 | 1.519 | 64.2 | 2.818 |
| S17 |  | Infinity | 0.500 |  |  | 2.846 |
| S18 | Cover Glass | Infinity | 0.400 | 1.500 | 67.0 | 2.898 |
| S19 |  | Infinity | 0.278 |  |  | 2.926 |
| S20 | Imaging Plane | Infinity | 0.000 |  |  | 2.955 |

TABLE 12

| Surface No. | S3 | S4 | S5 | S6 | S7 | S8 |
|---|---|---|---|---|---|---|
| K | 0.0000E+00 | 0.0000E+00 | 0.0000E+00 | 0.0000E+00 | 0.0000E+00 | 0.0000E+00 |
| A | 1.5653E−02 | 2.0861E−02 | −3.7074E−03 | 1.0245E−02 | 1.1974E−02 | −7.8247E−04 |
| B | −2.2529E−03 | −4.8537E−04 | 2.4520E−03 | 8.8298E−04 | −4.1928E−03 | −6.7484E−04 |
| C | 1.3183E−04 | −2.5820E−04 | −3.7487E−04 | −2.4574E−04 | −3.4026E−05 | 1.3259E−04 |
| D | −2.7992E−06 | 0.0000E+00 | 0.0000E+00 | 2.3174E−05 | 5.3304E−05 | 0.0000E+00 |

| Surface No. | S10 | S11 | S12 | S13 | S14 | S15 |
|---|---|---|---|---|---|---|
| K | 0.0000E+00 | 0.0000E+00 | 0.0000E+00 | 0.0000E+00 | −7.1251E−01 | −3.3944E+00 |
| A | −4.5690E−03 | −6.4148E−04 | −4.4470E−03 | −7.1297E−03 | −1.0628E−02 | 1.0232E−03 |
| B | 6.7139E−05 | 3.4123E−03 | 5.3685E−03 | 6.1769E−03 | 4.2664E−03 | 2.6126E−04 |
| C | 3.9199E−04 | −6.0173E−04 | −1.4911E−03 | −1.4007E−03 | −6.7759E−04 | −9.8906E−05 |
| D | −6.2293E−05 | −8.7821E−06 | 9.0308E−06 | 9.4811E−05 | 3.4166E−05 | 8.3689E−07 |

Figure 13:
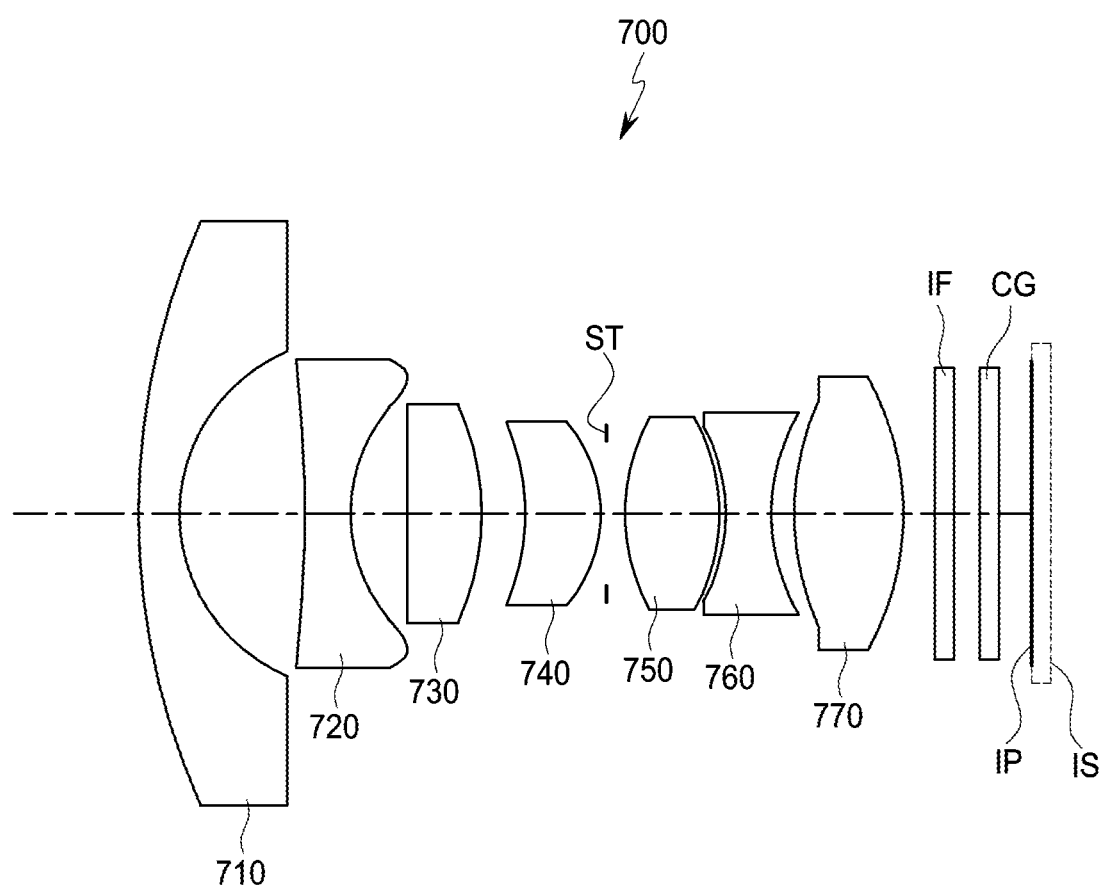
FIG. 13 illustrates a configuration of an example imaging lens system according to a seventh example.

An imaging lens system according to a seventh example will be described with reference to FIG. 13.

The imaging lens system 700 includes a first lens 710, a second lens 720, a third lens 730, a fourth lens 740, a fifth lens 750, a sixth lens 760, and a seventh lens 770.

The first lens 710 may have a negative refractive power, and a convex object-side surface and a concave image-side surface. The second lens 720 may have a negative refractive power, and may have a concave object-side surface and a concave image-side surface. The third lens 730 may have a positive refractive power, and may have a concave object-side surface and a convex image-side surface. The fourth lens 740 may have a positive refractive power and may have a concave object-side surface and a convex image-side surface. The fifth lens 750 may have a positive refractive power, and may have a convex object-side surface and a convex image-side surface. The sixth lens 760 may have a negative refractive power, and may have a concave object-side surface and a concave image-side surface. The seventh lens 770 may have a positive refractive power, and may have a convex object-side surface and a convex image-side surface.

The imaging lens system 700 may include a lens having an inflection point. For example, an inflection point may be formed on the object-side surface of the second lens 720 in the imaging lens system 700 according to the present example. However, a lens in which an inflection point is formed is not limited to the second lens 720.

The imaging lens system 700 may further include a stop ST, a filter IF, a cover glass CG, and an imaging plane IP. The stop ST may be disposed between the fourth lens 740 and the fifth lens 750, and the filter IF and the cover glass CG may be sequentially disposed between the seventh lens 770 and the imaging plane IP. The imaging plane IP may be formed on one surface of an image sensor IS of a camera module, or inside the image sensor IS.

Figure 14:
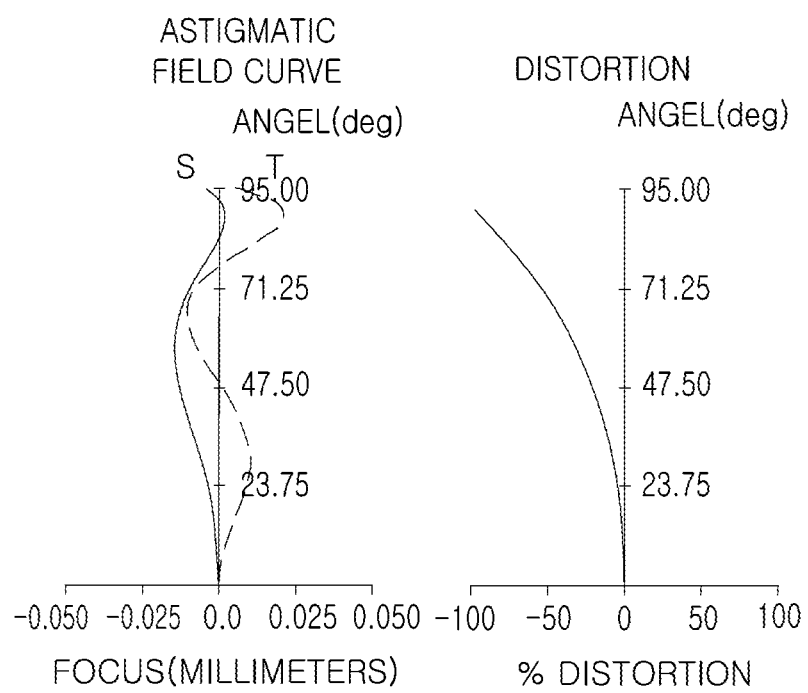
FIG. 14 illustrates an aberration curve of the example imaging lens system illustrated in FIG. 13.

Tables 13 and 14 below illustrate lens characteristics and aspheric values of the imaging lens system according to the present example, and FIG. 14 is an aberration curve of the imaging lens system according to the present example.

TABLE 13

| Surface No. | Configuration | Radius of Curvature | Thickness/ Distance | Refractive Index | Abbe Number | Effective Radius |
|---|---|---|---|---|---|---|
| S1 | First Lens | 13.844 | 0.800 | 1.776 | 49.6 | 5.737 |
| S2 |  | 3.573 | 2.487 |  |  | 3.250 |
| S3 | Second Lens | −9.374 | 0.800 | 1.539 | 56.0 | 3.022 |
| S4 |  | 4.346 | 1.080 |  |  | 2.234 |
| S5 | Third Lens | −165.076 | 1.422 | 1.613 | 26.9 | 2.193 |
| S6 |  | −4.130 | 0.879 |  |  | 2.107 |
| S7 | Fourth Lens | −3.913 | 1.431 | 1.539 | 56.0 | 1.846 |
| S8 |  | −3.026 | 0.110 |  |  | 1.898 |
| S9 | Stop | Infinity | 0.346 |  |  | 1.446 |
| S10 | Fifth Lens | 3.889 | 1.799 | 1.621 | 63.9 | 1.778 |
| S11 |  | −3.304 | 0.110 |  |  | 1.814 |
| S12 | Sixth Lens | −3.597 | 0.800 | 1.646 | 23.5 | 1.766 |
| S13 |  | 3.570 | 0.441 |  |  | 1.978 |
| S14 | Seventh Lens | 5.020 | 2.101 | 1.539 | 56.0 | 2.387 |
| S15 |  | −5.285 | 0.600 |  |  | 2.671 |
| S16 | Filter | Infinity | 0.400 | 1.519 | 64.2 | 2.796 |
| S17 |  | Infinity | 0.500 |  |  | 2.823 |
| S18 | Cover Glass | Infinity | 0.400 | 1.500 | 67.0 | 2.874 |
| S19 |  | Infinity | 0.493 |  |  | 2.901 |
| S20 | Imaging Plane | Infinity | 0.000 |  |  | 2.952 |

TABLE 14

| Surface No. | S3 | S4 | S5 | S6 | S7 | S8 |
|---|---|---|---|---|---|---|
| K | 0.0000E+00 | 0.0000E+00 | 0.0000E+00 | 0.0000E+00 | 0.0000E+00 | 0.0000E+00 |
| A | 1.4863E−02 | 1.7186E−02 | −4.4632E−03 | 8.6468E−03 | 1.3954E−02 | −1.8067E−03 |
| B | −2.3097E−03 | 2.4453E−04 | 3.1717E−03 | 1.4103E−03 | −4.1024E−03 | −2.6996E−04 |
| C | 1.5831E−04 | −2.9836E−04 | −4.8109E−04 | −4.3202E−04 | −8.2063E−05 | 8.0432E−05 |
| D |  |  |  | 3.5362E−05 | 4.9980E−05 |  |

| Surface No. | S10 | S11 | S12 | S13 | S14 | S15 |
|---|---|---|---|---|---|---|
| K | 0.0000E+00 | 0.0000E+00 | 0.0000E+00 | 0.0000E+00 | −7.1849E−01 | −4.2026E+00 |
| A | −6.7010E−03 | −1.5403E−03 | −5.9286E−03 | −9.9864E−03 | −8.8954E−03 | 1.2979E−03 |
| B | 4.4249E−04 | 5.2850E−03 | 8.3694E−03 | 6.4482E−03 | 3.0634E−03 | 4.5931E−05 |
| C | 3.1205E−04 | −1.1008E−03 | −2.3764E−03 | −1.6491E−03 | −4.3262E−04 | −3.5923E−05 |
| D | −3.7262E−05 | 1.1442E−05 | 4.2796E−05 | 1.2946E−04 | 1.9146E−05 | −2.7304E−06 |

Figure 15:
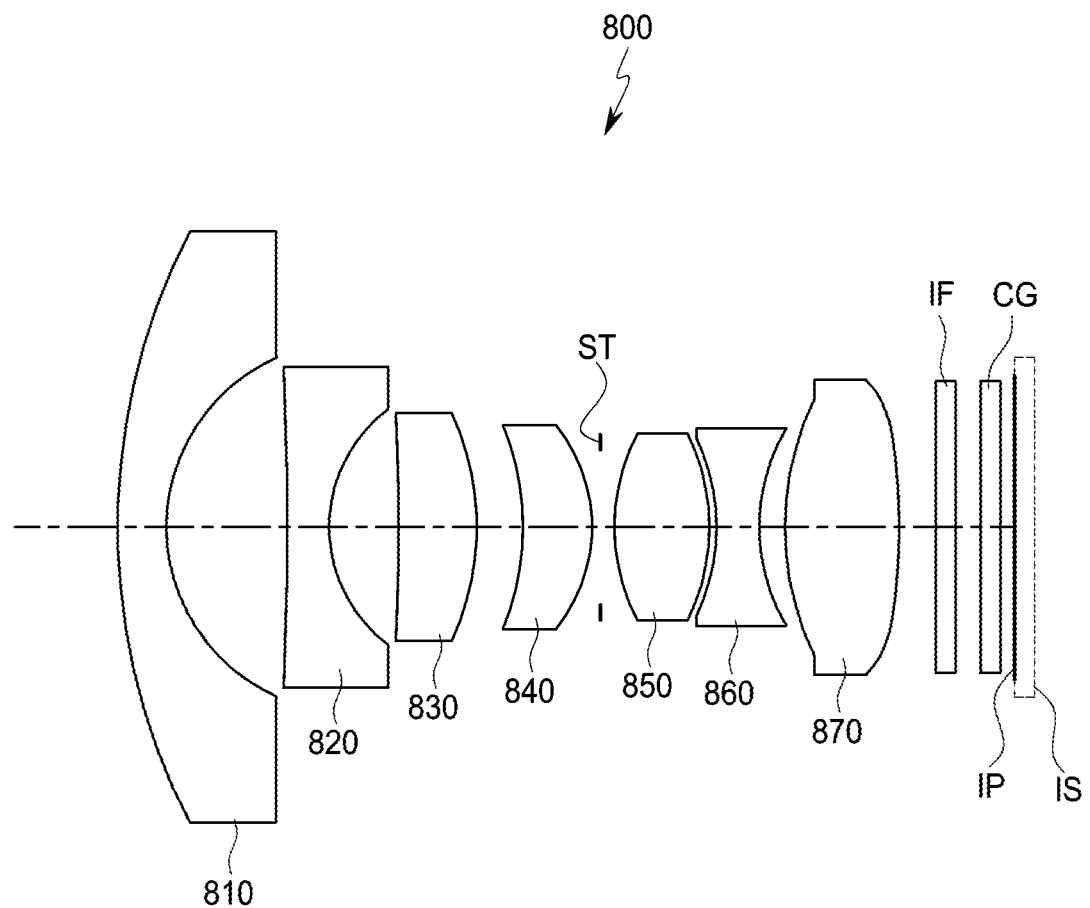
FIG. 15 illustrates a configuration of an example imaging lens system according to an eighth example.

An imaging lens system according to an eighth example will be described with reference to FIG. 15.

The imaging lens system 800 may include a first lens 810, a second lens 820, a third lens 830, a fourth lens 840, a fifth lens 850, a sixth lens 860, and a seventh lens 870.

The first lens 810 may have a negative refractive power, and a convex object-side surface and a concave image-side surface. The second lens 820 may have a negative refractive power, and may have a concave object-side surface and a concave image-side surface. The third lens 830 may have a positive refractive power, and may have a concave object-side surface and a convex image-side surface. The fourth lens 840 may have a positive refractive power, and may have a concave object-side surface and a convex image-side surface. The fifth lens 850 may have positive refractive power and may have a convex object-side surface and a convex image-side surface. The sixth lens 860 may have a negative refractive power and may have a concave object-side surface and a concave image-side surface. The seventh lens 870 may have positive refractive power, and may have a convex object-side surface and a convex image-side surface.

The imaging lens system 800 may include a lens having an inflection point. For example, an inflection point may be formed on the object-side surface of the second lens 820 in the imaging lens system 800 according to the present example. However, a lens in which an inflection point is formed is not limited to the second lens 820.

The imaging lens system 800 may further include a stop ST, a filter IF, a cover glass CG, and an imaging plane IP. The stop ST may be disposed between the fourth lens 840 and the fifth lens 850, and the filter IF and the cover glass CG may be sequentially disposed between the seventh lens 870 and the imaging plane IP. The imaging plane IP may be formed on one surface of an image sensor IS of a camera module, or inside the image sensor IS.

Figure 16:
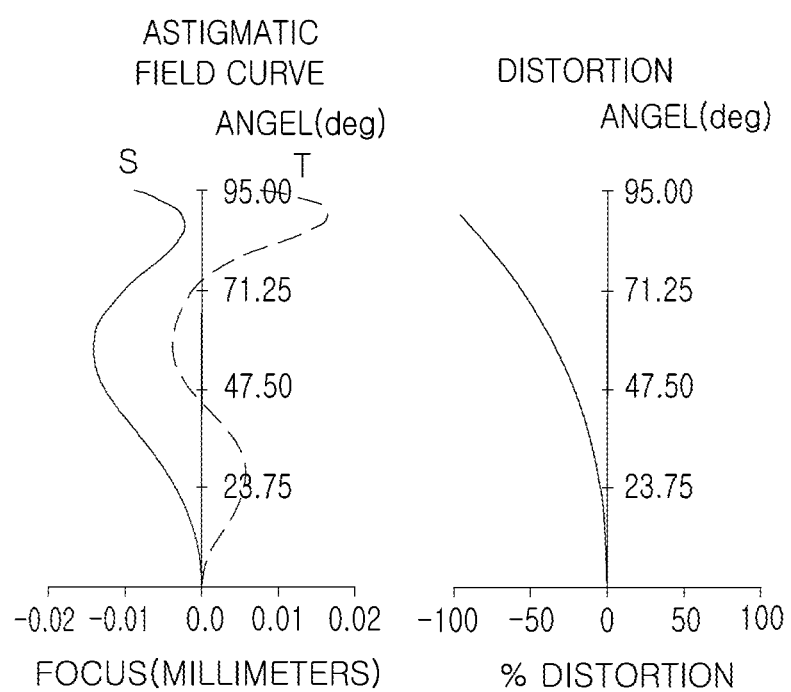
FIG. 16 illustrates an aberration curve of the example imaging lens system illustrated in FIG. 15.

Tables 15 and 16 below illustrate lens characteristics and aspherical values of the imaging lens system according to the present example, and FIG. 16 is an aberration curve of the imaging lens system according to the present example.

TABLE 15

| Surface No. | Configuration | Radius of Curvature | Thickness/ Distance | Refractive Index | Abbe Number | Effective Radius |
| --- | --- | --- | --- | --- | --- | --- |
| S1 | First Lens | 13.453 | 0.810 | 1.776 | 49.6 | 5.805 |
| S2 | | 3.572 | 2.364 | | | 3.268 |
| S3 | Second Lens | −15.504 | 0.800 | 1.539 | 56.0 | 3.102 |
| S4 | | 3.570 | 1.298 | | | 2.215 |
| S5 | Third Lens | −24.430 | 1.501 | 1.613 | 26.9 | 2.202 |
| S6 | | −3.890 | 0.887 | | | 2.168 |
| S7 | Fourth Lens | −4.710 | 1.350 | 1.539 | 56.0 | 1.912 |
| S8 | | −3.187 | 0.110 | | | 1.953 |
| S9 | Stop | Infinity | 0.275 | | | 1.488 |
| S10 | Fifth Lens | 3.643 | 1.841 | 1.585 | 59.5 | 1.788 |
| S11 | | −3.642 | 0.110 | | | 1.794 |
| S12 | Sixth Lens | −4.276 | 0.800 | 1.665 | 20.7 | 1.746 |
| S13 | | 3.745 | 0.521 | | | 1.883 |
| S14 | Seventh Lens | 4.505 | 2.231 | 1.539 | 56.0 | 2.522 |
| S15 | | −8.132 | 0.600 | | | 2.855 |
| S16 | Filter | Infinity | 0.400 | 1.519 | 64.2 | 2.907 |
| S17 | | Infinity | 0.500 | | | 2.917 |
| S18 | Cover Glass | Infinity | 0.400 | 1.500 | 67.0 | 2.937 |
| S19 | | Infinity | 0.200 | | | 2.948 |
| S20 | Imaging Plane | Infinity | 0.000 | | | 2.957 |

TABLE 16

| Surface No. | S3 | S4 | S5 | S6 | S7 | S8 |
| --- | --- | --- | --- | --- | --- | --- |
| K | 0.0000E+00 | 0.0000E+00 | 0.0000E+00 | 0.0000E+00 | 0.0000E+00 | 0.0000E+00 |
| A | 1.2488E−02 | 1.8974E−02 | −2.4840E−03 | 8.9698E−03 | 1.3257E−02 | −8.4577E−04 |
| B | −1.9893E−03 | −8.3062E−06 | 2.0378E−03 | 6.2389E−04 | −3.7374E−03 | −3.2311E−04 |
| C | 1.3397E−04 | −1.8060E−04 | −2.8719E−04 | −2.3153E−04 | 1.1881E−04 | 2.5559E−05 |
| D | −3.6637E−06 | −4.0127E−06 | 1.6095E−07 | 2.0608E−05 | 9.2512E−07 | 0.0000E+00 |

| Surface No. | S10 | S11 | S12 | S13 | S14 | S15 |
| --- | --- | --- | --- | --- | --- | --- |
| K | 0.0000E+00 | 0.0000E+00 | 0.0000E+00 | 0.0000E+00 | −1.1882E+00 | −1.5380E+00 |
| A | −5.2300E−03 | −2.4057E−03 | −6.0218E−03 | −6.4330E−03 | −9.9387E−03 | 4.8513E−04 |
| B | 7.0022E−04 | 5.3321E−03 | 7.0932E−03 | 5.9962E−03 | 2.5623E−03 | −2.4802E−04 |
| C | 8.8832E−05 | −1.3077E−03 | −2.2275E−03 | −1.5021E−03 | −2.9003E−04 | 4.4645E−05 |
| D | 0.0000E+00 | 7.8100E−05 | 9.6576E−05 | 1.1520E−04 | 8.6227E−06 | −7.5514E−06 |

Figure 17:
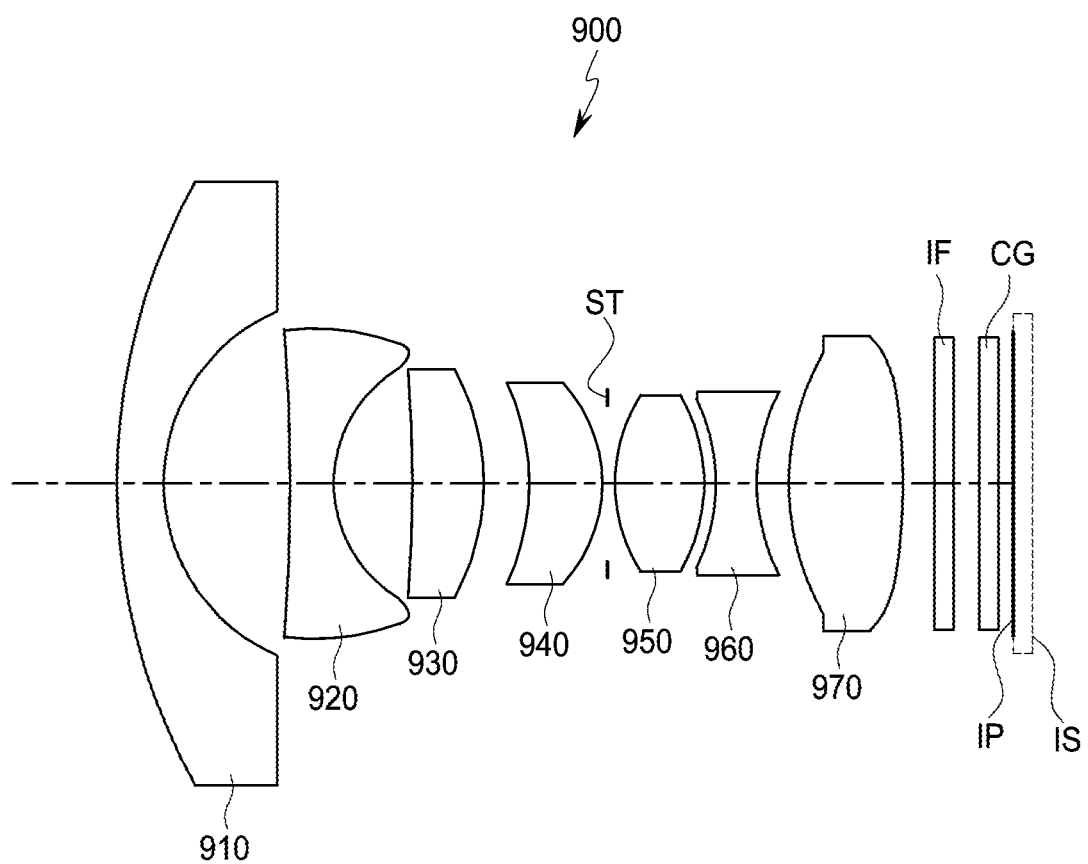
FIG. 17 illustrates a configuration of an example imaging lens system according to a ninth example.

An imaging lens system according to a ninth embodiment will be described with reference to FIG. 17.

The imaging lens system 900 may include a first lens 910, a second lens 920, a third lens 930, a fourth lens 940, a fifth lens 950, a sixth lens 960, and a seventh lens 970.

The first lens 910 may have a negative refractive power, and may have a convex object-side surface and a concave image-side surface. The second lens 920 may have a negative refractive power, and may have a concave object-side surface and a concave image-side surface. The third lens 930 may have a positive refractive power, and may have a concave object-side surface and a convex image-side surface. The fourth lens 940 may have a positive refractive power, and may have a concave object-side surface and a convex image-side surface. The fifth lens 950 may have a positive refractive power and may have a convex object-side surface and a convex image-side surface. The sixth lens 960 may have a negative refractive power, and may have a concave object-side surface and a concave image-side surface. The seventh lens 970 may have a positive refractive power, and may have a convex object-side surface and a convex image-side surface.

The imaging lens system 900 may include a lens having an inflection point. For example, an inflection point may be formed on the object-side surface of the second lens 920 in the imaging lens system 900 according to the present example. However, a lens in which an inflection point is formed is not limited to the second lens 920.

The imaging lens system 900 may further include a stop ST, a filter IF, a cover glass CG, and an imaging plane IP. The stop ST may be disposed between the fourth lens 940 and the fifth lens 950, and the filter IF and the cover glass CG may be sequentially disposed between the seventh lens 970 and the imaging plane IP. The imaging plane IP may be formed on one surface of an image sensor IS of a camera module, or inside the image sensor IS.

Figure 18:
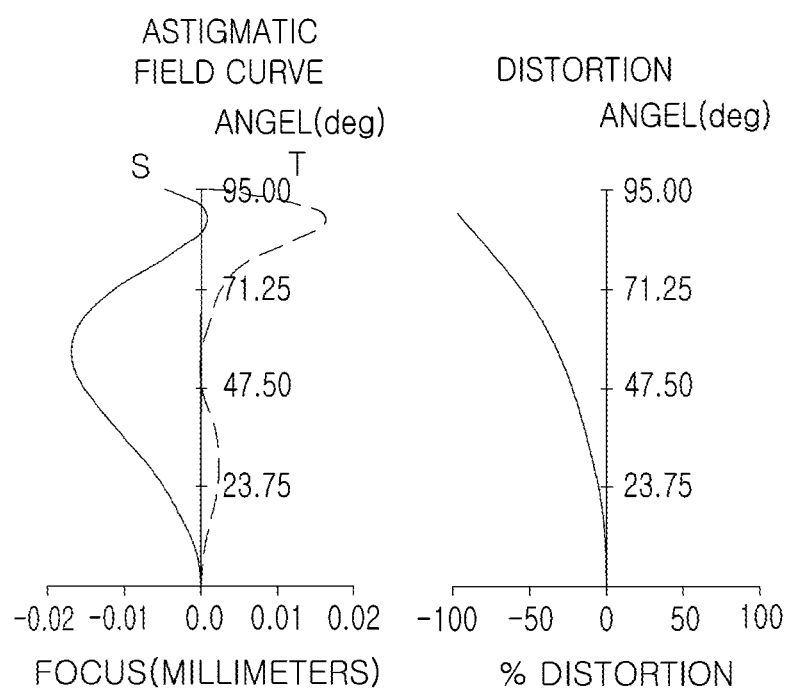
FIG. 18 illustrates an aberration curve of the example imaging lens system illustrated in FIG. 17.

Tables 17 and 18 below illustrate lens characteristics and aspherical values of the imaging lens system according to the present example, and FIG. 18 is an aberration curve of the imaging lens system according to the present example.

TABLE 17

| Surface No. | Configuration | Radius of Curvature | Thickness/ Distance | Refractive Index | Abbe Number | Effective Radius |
|---|---|---|---|---|---|---|
| S1 | First Lens | 13.218 | 0.800 | 1.776 | 49.6 | 5.923 |
| S2 | | 3.677 | 2.454 | | | 3.366 |
| S3 | Second Lens | −11.582 | 0.800 | 1.539 | 56.0 | 3.201 |
| S4 | | 3.403 | 1.470 | | | 2.277 |
| S5 | Third Lens | −27.711 | 1.406 | 1.613 | 26.9 | 2.266 |
| S6 | | −3.664 | 0.864 | | | 2.259 |
| S7 | Fourth Lens | −4.870 | 1.392 | 1.539 | 56.0 | 1.949 |
| S8 | | −3.180 | 0.110 | | | 2.012 |
| S9 | Stop | Infinity | 0.110 | | | 1.526 |
| S10 | Fifth Lens | 3.430 | 1.749 | 1.489 | 70.2 | 1.740 |
| S11 | | −3.478 | 0.160 | | | 1.764 |
| S12 | Sixth Lens | −4.396 | 0.800 | 1.668 | 20.4 | 1.698 |
| S13 | | 4.433 | 0.589 | | | 1.845 |
| S14 | Seventh Lens | 4.125 | 2.197 | 1.539 | 56.0 | 2.647 |
| S15 | | −13.080 | 0.600 | | | 2.945 |
| S16 | Filter | Infinity | 0.400 | 1.519 | 64.2 | 2.947 |
| S17 | | Infinity | 0.500 | | | 2.947 |
| S18 | Cover Glass | Infinity | 0.400 | 1.500 | 67.0 | 2.948 |
| S19 | | Infinity | 0.200 | | | 2.948 |
| S20 | Imaging Plane | Infinity | 0.000 | | | 2.952 |

TABLE 18

| Surface No. | S3 | S4 | S5 | S6 | S7 | S8 |
|---|---|---|---|---|---|---|
| K | 0.0000E+00 | 0.0000E+00 | 0.0000E+00 | 0.0000E+00 | 0.0000E+00 | 0.0000E+00 |
| A | 1.3380E−02 | 2.1341E−02 | −2.0549E−03 | 1.1085E−02 | 1.6647E−02 | 3.4050E−04 |
| B | −1.7835E−03 | 6.0519E−04 | 2.1892E−03 | 1.7899E−04 | −5.3836E−03 | −4.4804E−04 |
| C | 1.0822E−04 | 1.5664E−05 | −4.0161E−04 | −2.2804E−04 | 4.9594E−04 | 1.2788E−05 |
| D | −3.0079E−06 | −6.6141E−05 | 1.1802E−05 | 2.1285E−05 | −5.8307E−05 | 0.0000E+00 |

| Surface No. | S10 | S11 | S12 | S13 | S14 | S15 |
|---|---|---|---|---|---|---|
| K | 0.0000E+00 | 0.0000E+00 | 0.0000E+00 | 0.0000E+00 | −1.3585E+00 | −8.2641E−01 |
| A | −6.0650E−03 | −3.2291E−03 | −3.1351E−03 | −7.5640E−04 | −7.8503E−03 | −2.6504E−03 |
| B | 9.8631E−04 | 4.0989E−03 | 1.7962E−03 | 1.7690E−03 | 1.5380E−03 | 6.8819E−04 |
| C | 1.7642E−04 | −4.1834E−04 | 1.6703E−04 | −2.5277E−05 | −1.1480E−04 | −6.6489E−05 |
| D | −3.6795E−05 | −9.0310E−05 | −2.6481E−04 | −4.0008E−05 | −7.6228E−07 | −2.2305E−06 |

Figure 19:
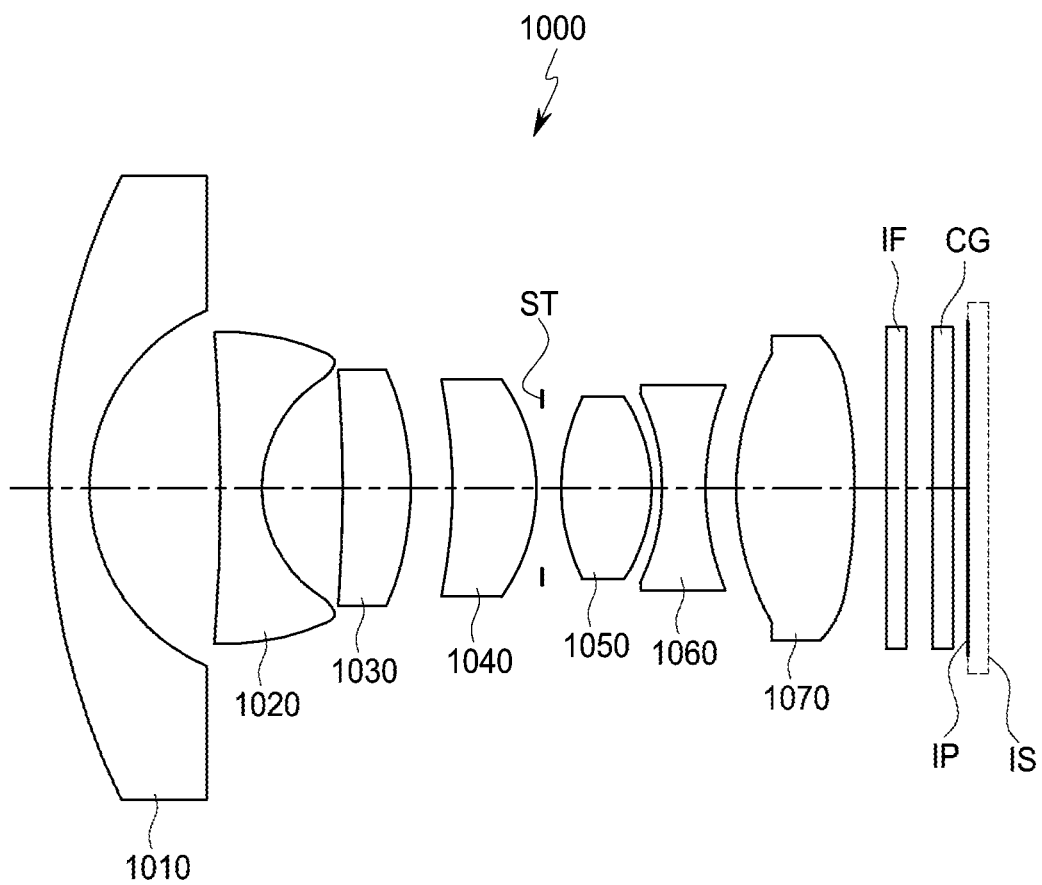
FIG. 19 illustrates a configuration of an example imaging lens system according to a tenth example.

An imaging lens system according to a tenth embodiment will be described with reference to FIG. 19.

The imaging lens system 1000 may include a first lens 1010, a second lens 1020, a third lens 1030, a fourth lens 1040, a fifth lens 1050, a sixth lens 1060, and a seventh lens 1070.

The first lens 1010 may have a negative refractive power, and may have a convex object-side surface and a concave image-side surface. The second lens 1020 may have a negative refractive power, and may have a concave object-side surface and a concave image-side surface. The third lens 1030 may have a positive refractive power, and may have a concave object-side surface and a convex image-side surface. The fourth lens 1040 may have a positive refractive power, and may have a concave object-side surface and a convex image-side surface. The fifth lens 1050 may have a positive refractive power and may have a convex object-side surface and a convex image-side surface. The sixth lens 1060 may have a negative refractive power, and may have a concave object-side surface and a concave image-side surface. The seventh lens 1070 may have positive refractive power, and may have a convex object-side surface and a convex image-side surface.

The imaging lens system 1000 may include a lens having an inflection point. For example, an inflection point may be formed on the object-side surface of the second lens 1020 in the imaging lens system 1000 according to the present example. However, a lens in which an inflection point is formed is not limited to the second lens 1020.

The imaging lens system 1000 may further include a stop ST, a filter IF, a cover glass CG, and an imaging plane IP. The stop ST may be disposed between the fourth lens 1040 and the fifth lens 1050, and the filter IF and the cover glass CG may be sequentially disposed between the seventh lens 1070 and the imaging plane IP. The imaging plane IP may be formed on one surface of an image sensor IS of a camera module, or inside the image sensor IS.

Figure 20:
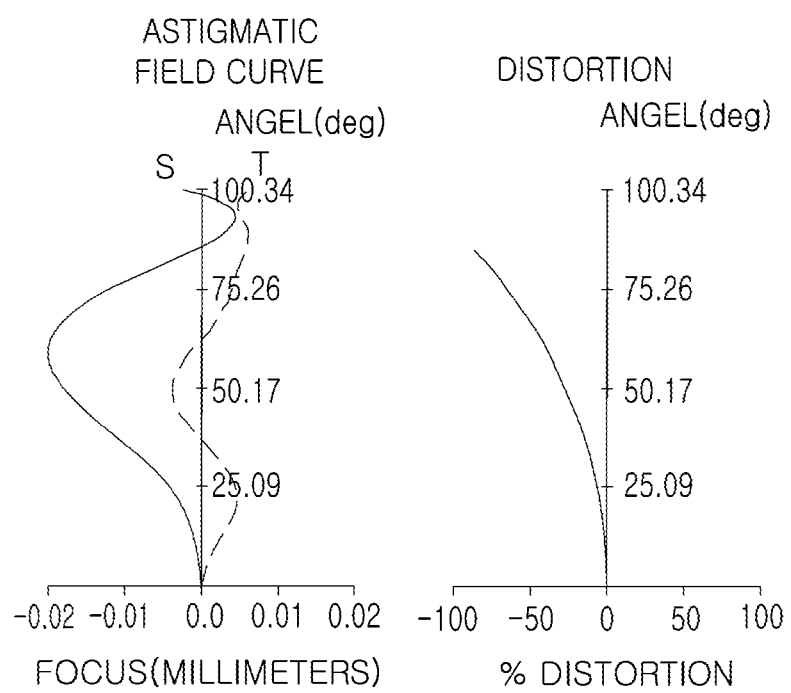
FIG. 20 illustrates an aberration curve of the example imaging lens system illustrated in FIG. 19.

Tables 19 and 20 below illustrate lens characteristics and aspherical values of the imaging lens system according to the present example, and FIG. 20 is an aberration curve of the imaging lens system according to the present example.

TABLE 19

| Surface No. | Configuration | Radius of Curvature | Thickness/ Distance | Refractive Index | Abbe Number | Effective Radius |
|---|---|---|---|---|---|---|
| S1 | First Lens | 12.880 | 0.800 | 1.776 | 49.6 | 5.954 |
| S2 | | 3.670 | 2.418 | | | |
| S3 | Second Lens | −10.670 | 0.800 | 1.539 | 56.0 | 3.200 |
| S4 | | 3.550 | 1.421 | | | |
| S5 | Third Lens | −21.660 | 1.329 | 1.620 | 25.6 | 2.217 |
| S6 | | −4.040 | 0.763 | | | |
| S7 | Fourth Lens | −6.770 | 1.580 | 1.539 | 56.0 | 2.013 |
| S8 | | −3.180 | 0.110 | | | |
| S9 | Stop | Infinity | 0.257 | | | |
| S10 | Fifth Lens | 3.840 | 1.725 | 1.489 | 70.2 | 1.779 |
| S11 | | −3.550 | 0.184 | | | |
| S12 | Sixth Lens | −4.880 | 0.800 | 1.667 | 20.4 | 1.771 |
| S13 | | 4.040 | 0.497 | | | |
| S14 | Seventh Lens | 3.880 | 2.216 | 1.539 | 56.0 | 2.648 |
| S15 | | −13.750 | 0.600 | | | |
| S16 | Filter | Infinity | 0.400 | 1.519 | 64.2 | 2.983 |
| S17 | | Infinity | 0.500 | | | |
| S18 | Cover Glass | Infinity | 0.400 | 1.500 | 67.0 | 3.003 |
| S19 | | Infinity | 0.200 | | | |
| S20 | Imaging Plane | Infinity | 0.000 | | | |

TABLE 20

| Surface No. | S3 | S4 | S5 | S6 | S7 | S8 |
|---|---|---|---|---|---|---|
| K | −1.0700E+01 | 3.5500E+00 | −2.1700E+01 | −4.0400E+00 | −6.7700E+00 | −3.1800E+00 |
| A | 0.0000E+00 | 0.0000E+00 | 0.0000E+00 | 0.0000E+00 | 0.0000E+00 | 0.0000E+00 |
| B | 1.3600E−02 | 2.0600E−02 | −4.0800E−03 | 1.1600E−02 | 1.6200E−02 | −3.0100E−04 |
| C | −1.5400E−03 | 3.9800E−04 | 2.7300E−03 | 5.4700E−04 | −5.0400E−03 | 3.9400E−05 |
| D | 7.5000E−05 | 4.1400E−04 | −5.0500E−04 | −3.8000E−04 | 4.9900E−04 | −5.1500E−05 |
| E | −1.6300E−06 | −1.3300E−04 | 9.0100E−06 | 3.7300E−05 | −6.7600E−05 | |

| Surface No. | S10 | S11 | S12 | S13 | S14 | S15 |
|---|---|---|---|---|---|---|
| K | 3.8400E+00 | −3.5500E+00 | −4.8800E+00 | 4.0400E+00 | 3.8800E+00 | −1.3700E+01 |
| A | 0.0000E+00 | 0.0000E+00 | 0.0000E+00 | 0.0000E+00 | −1.4500E+00 | 3.7900E+00 |
| B | −8.5200E−03 | −1.3600E−02 | −8.0200E−03 | 2.0100E−04 | −7.0500E−03 | −2.7900E−03 |
| C | 1.1200E−03 | 1.2300E−02 | 8.9900E−03 | 9.1400E−04 | 1.2300E−03 | 6.7600E−04 |
| D | 2.0000E−04 | −3.0100E−03 | −2.7000E−03 | −4.0200E−04 | −8.8500E−05 | −5.7800E−05 |
| E | −1.7300E−05 | 2.7000E−04 | 1.6300E−04 | 3.3200E−05 | −9.9200E−07 | −2.5300E−06 |

Figure 21:
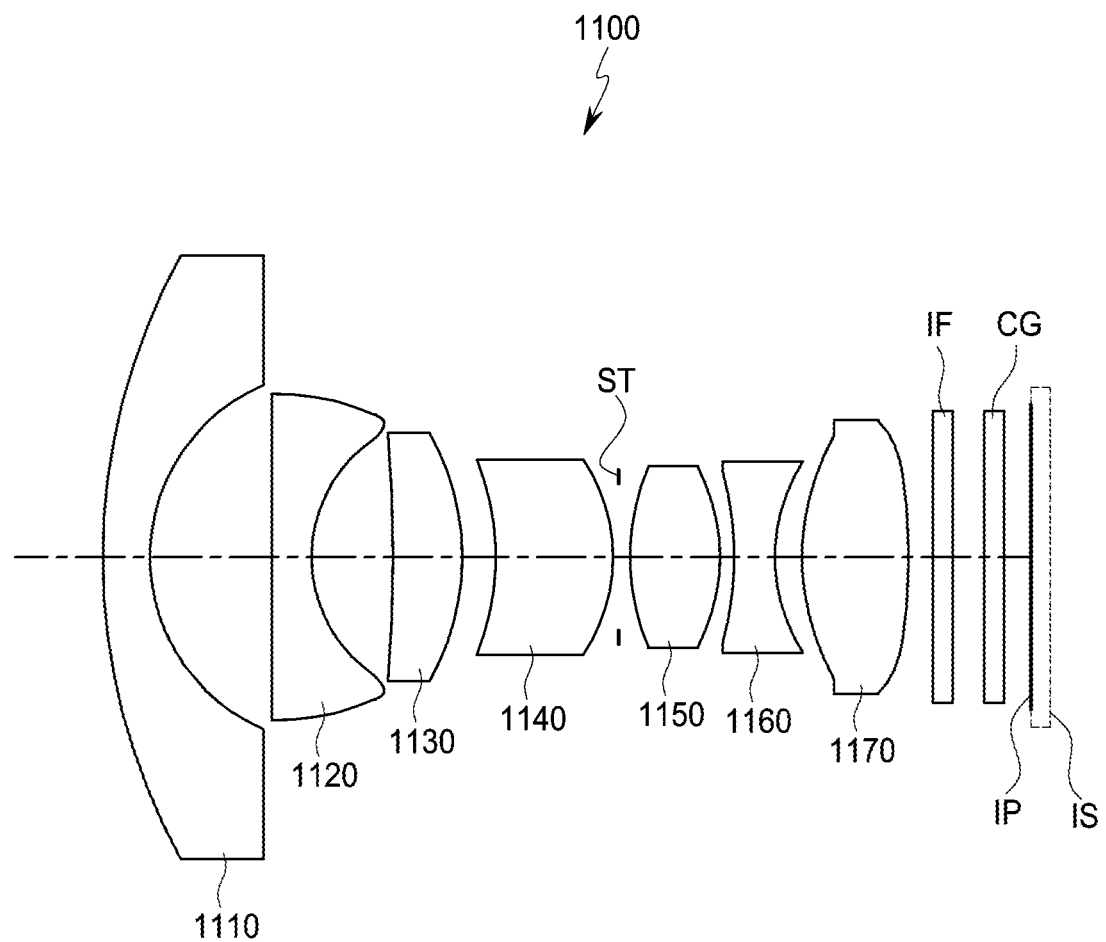
FIG. 21 illustrates a configuration of an example imaging lens system according to an eleventh example.

An imaging lens system according to an eleventh embodiment will be described with reference to FIG. 21.

The imaging lens system 1100 may include a first lens 1110, a second lens 1120, a third lens 1130, a fourth lens 1140, a fifth lens 1150, a sixth lens 1160, and a seventh lens 1170.

The first lens 1110 may have a negative refractive power, and may have a convex object-side surface and a concave image-side surface. The second lens 1120 may have a negative refractive power and may have a concave object-side surface and a concave image-side surface. The third lens 1130 may have a positive refractive power, and may have a concave object-side surface and a convex image-side surface. The fourth lens 1140 may have a positive refractive power, and may have a concave object-side surface and a convex image-side surface. The fifth lens 1150 may have a positive refractive power and may have a convex object-side surface and a convex image-side surface. The sixth lens 1160 may have a negative refractive power, and may have a concave object-side surface and a concave image-side surface. The seventh lens 1170 may have positive refractive power, and may have a convex object-side surface and a convex image-side surface.

The imaging lens system 1100 may include a lens having an inflection point. For example, an inflection point may be formed on the object-side surface of the second lens 1120 in the imaging lens system 1100 according to the present example. However, a lens in which an inflection point is formed is not limited to the second lens 1120.

The imaging lens system 1100 may further include a stop ST, a filter IF, a cover glass CG, and an imaging plane IP. The stop ST may be disposed between the fourth lens 1140 and the fifth lens 1150, and the filter IF and the cover glass CG may be sequentially disposed between the seventh lens 1170 and the imaging plane IP. The imaging plane IP may be formed on one surface of the image sensor IS of the camera module or inside the image sensor IS.

Figure 22:
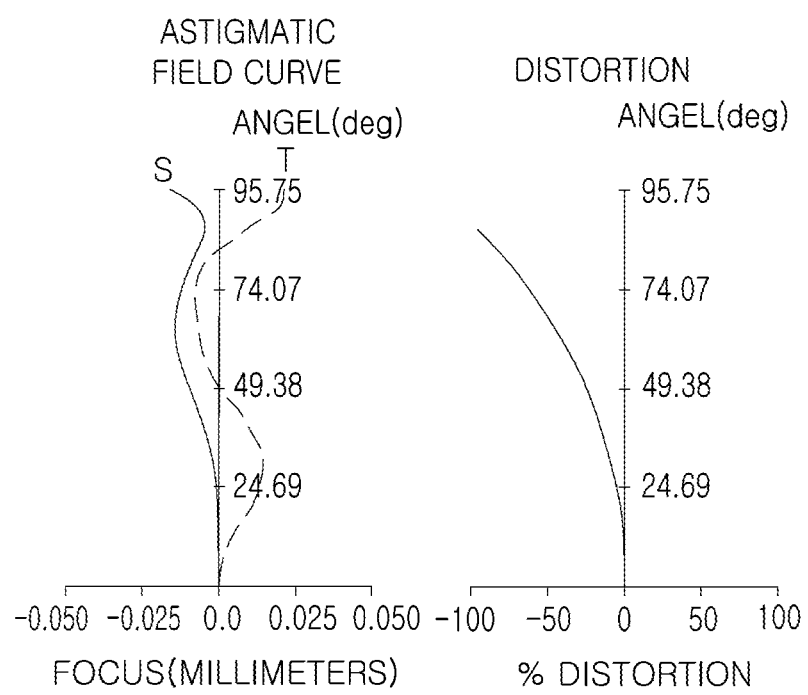
FIG. 22 illustrates an aberration curve of the imaging lens system illustrated in FIG. 21.

Tables 21 and 22 below illustrate lens characteristics and aspherical values of the imaging lens system according to the present example, and FIG. 22 is an aberration curve of the imaging lens system according to the present example.

TABLE 21

| Surface No. | Configuration | Radius of Curvature | Thickness/ Distance | Refractive Index | Abbe Number | Effective Radius |
|---|---|---|---|---|---|---|
| S1 | First Lens | 15.840 | 0.800 | 1.776 | 49.6 | 6.103 |
| S2 | | 3.900 | 2.394 | | | 3.523 |
| S3 | Second Lens | −12.655 | 0.800 | 1.539 | 56.0 | 3.398 |
| S4 | | 3.800 | 1.499 | | | 2.527 |
| S5 | Third Lens | −38.068 | 1.406 | 1.620 | 25.6 | 2.488 |
| S6 | | −4.392 | 0.642 | | | 2.400 |
| S7 | Fourth Lens | −6.316 | 2.361 | 1.539 | 56.0 | 1.944 |
| S8 | | −3.402 | 0.110 | | | 1.850 |
| S9 | Stop | Infinity | 0.214 | | | 1.465 |
| S10 | Fifth Lens | 4.475 | 1.784 | 1.489 | 70.2 | 1.661 |
| S11 | | −3.785 | 0.255 | | | 1.791 |
| S12 | Sixth Lens | −7.232 | 0.800 | 1.667 | 20.4 | 1.769 |
| S13 | | 3.798 | 0.478 | | | 1.908 |
| S14 | Seventh Lens | 4.249 | 2.090 | 1.539 | 56.0 | 2.494 |
| S15 | | −13.592 | 0.500 | | | 2.789 |
| S16 | Filter | Infinity | 0.400 | 1.519 | 64.2 | 2.877 |
| S17 | | Infinity | 0.600 | | | 2.899 |
| S18 | Cover Glass | Infinity | 0.400 | 1.500 | 67.0 | 2.949 |
| S19 | | Infinity | 0.467 | | | 2.971 |
| S20 | Imaging Plane | Infinity | 0.000 | | | 3.010 |

TABLE 22

| Surface No. | S3 | S4 | S5 | S6 | S7 | S8 |
|---|---|---|---|---|---|---|
| K | 0.0000E+00 | 0.0000E+00 | 0.0000E+00 | 0.0000E+00 | 0.0000E+00 | 0.0000E+00 |
| A | 5.5800E−01 | 4.4600E−01 | −8.0000E−03 | 1.7100E−01 | −4.3000E−02 | −4.0000E−03 |
| B | −1.5800E−01 | −1.0700E−01 | −6.0000E−03 | −1.9000E−02 | −2.7000E−02 | 0.0000E+00 |
| C | 2.5000E−02 | −2.5000E−02 | −1.2000E−02 | 0.0000E+00 | 0.0000E+00 | 0.0000E+00 |
| D | −3.0000E−03 | −2.0000E−03 | 1.0000E−03 | 2.0000E−03 | 0.0000E+00 | 0.0000E+00 |

| Surface No. | S10 | S11 | S12 | S13 | S14 | S15 |
|---|---|---|---|---|---|---|
| K | 0.0000E+00 | 0.0000E+00 | 0.0000E+00 | 0.0000E+00 | −1.6260E+00 | 1.3330E+01 |
| A | −3.4000E−02 | 2.0000E−03 | −7.0000E−03 | 1.7000E−02 | −1.3000E−01 | −1.8100E−01 |
| B | 1.0000E−03 | 6.0000E−03 | −3.0000E−03 | −4.0000E−03 | 1.0000E−02 | −3.2000E−02 |
| C | 0.0000E+00 | −1.0000E−03 | −2.0000E−03 | −1.0000E−03 | −2.0000E−03 | −2.0000E−03 |
| D | 0.0000E+00 | 1.0000E−03 | 1.0000E−03 | 0.0000E+00 | 0.0000E+00 | 0.0000E+00 |

Tables 23 to 25 below illustrate optical characteristic values and conditional expression values of the imaging lens systems according to the first to eleventh examples.

TABLE 23

| Remark | First Embodiment | Second Embodiment | Third Embodiment | Fourth Embodiment | Fifth Embodiment | Sixth Embodiment |
|---|---|---|---|---|---|---|
| TTL | 17.000 | 17.000 | 17.001 | 17.000 | 16.999 | 17.000 |
| BFL | 2.448 | 2.416 | 2.100 | 2.100 | 2.505 | 2.178 |
| f number | 1.859 | 1.859 | 1.859 | 1.859 | 1.900 | 1.859 |
| f | 1.875 | 1.875 | 1.890 | 1.890 | 1.902 | 1.902 |
| f1 | −7.798 | −8.350 | −7.460 | −6.969 | −6.759 | −6.198 |
| f2 | −6.327 | −5.917 | −6.329 | −6.144 | −5.518 | −6.224 |
| f3 | 11.119 | 11.098 | 12.130 | 10.493 | 8.041 | 7.907 |
| f4 | 9.827 | 9.956 | 10.464 | 10.147 | 10.425 | 14.680 |
| f5 | 3.740 | 3.752 | 3.861 | 3.892 | 3.560 | 3.304 |
| f6 | −2.297 | −2.328 | −2.862 | −2.936 | −2.603 | −2.860 |
| f7 | 4.215 | 4.238 | 4.992 | 5.040 | 4.677 | 5.550 |
| f1234 | 5.193 | 5.441 | 7.240 | 7.059 | 7.477 | 6.570 |
| f567 | 7.442 | 7.312 | 6.638 | 6.562 | 6.520 | 6.750 |
| ImgHT | 3.688 | 3.688 | 3.688 | 3.688 | 3.688 | 3.688 |
| FOV | 190.0 | 190.0 | 190.0 | 190.0 | 190.0 | 190.0 |
| HImH | 2.880 | 2.880 | 2.880 | 2.880 | 2.880 | 2.880 |
| HFOV | 180.0 | 180.0 | 180.0 | 180.0 | 180.0 | 180.0 |

| Remark | Seventh Embodiment | Eighth Embodiment | Ninth Embodiment | Tenth Embodiment | Eleventh Embodiment |
|---|---|---|---|---|---|
| TTL | 16.999 | 16.998 | 17.001 | 17.000 | 18.000 |
| BFL | 2.393 | 2.100 | 2.100 | 2.100 | 2.367 |
| f number | 1.859 | 1.859 | 1.859 | 1.848 | 1.848 |
| f | 1.902 | 1.910 | 1.910 | 1.922 | 1.930 |
| f1 | −6.425 | −6.500 | −6.814 | −6.875 | −6.868 |
| f2 | −5.399 | −5.306 | −4.790 | −4.847 | −5.331 |
| f3 | 6.887 | 7.344 | 6.738 | 7.785 | 7.882 |
| f4 | 15.825 | 13.954 | 13.195 | 9.640 | 10.656 |
| f5 | 3.181 | 3.433 | 3.852 | 4.085 | 4.514 |
| f6 | −2.657 | −2.887 | −3.189 | −3.199 | −3.628 |
| f7 | 5.144 | 5.733 | 6.091 | 5.873 | 6.263 |
| f1234 | 12.201 | 9.505 | 7.151 | 5.926 | 6.272 |
| f567 | 5.808 | 6.282 | 6.925 | 7.341 | 7.541 |
| ImgHT | 3.688 | 3.688 | 3.688 | 3.688 | 3.688 |
| FOV | 190.0 | 190.0 | 190.0 | 200.7 | 197.5 |
| HImH | 2.880 | 2.880 | 2.880 | 2.880 | 2.880 |
| HFOV | 180.0 | 180.0 | 180.0 | 180.0 | 180.0 |

TABLE 24

| Conditional Expression | First Embodiment | Second Embodiment | Third Embodiment | Fourth Embodiment | Fifth Embodiment | Sixth Embodiment |
|---|---|---|---|---|---|---|
| HFOV/L1S1ED | 14.8515 | 14.7493 | 15.3479 | 15.4985 | 15.6876 | 15.7095 |
| L1S1ED/TTL | 0.7129 | 0.7179 | 0.6898 | 0.6832 | 0.6750 | 0.6740 |
| f1/f2 | 1.2325 | 1.4111 | 1.1788 | 1.1344 | 1.2248 | 0.9959 |
| f1/f3 | −0.7013 | −0.7524 | −0.6150 | −0.6642 | −0.8405 | −0.7839 |
| V1 − V3 | 23.6880 | 23.6880 | 22.7200 | 22.7200 | 22.7200 | 22.7200 |
| V5 − V6 | 32.2990 | 33.5630 | 36.7050 | 35.6430 | 32.4890 | 42.8470 |
| HFOV*f | 337.4712 | 337.4622 | 340.2306 | 340.2306 | 342.3060 | 342.3006 |
| f/f6 | −0.8162 | −0.8053 | −0.6605 | −0.6437 | −0.7306 | −0.6648 |
| f1/f | −4.1592 | −4.4539 | −3.9468 | −3.6871 | −3.5540 | −3.2592 |
| f1/f4 | −0.7935 | −0.8387 | −0.7129 | −0.6868 | −0.6483 | −0.4222 |
| f1/f7 | −1.8500 | −1.9705 | −1.4943 | −1.3827 | −1.4450 | −1.1168 |
| f5/f6 | −1.6281 | −1.6115 | −1.3493 | −1.3256 | −1.3678 | −1.1549 |
| (f5 + f7)/f6 | −3.4630 | −3.4316 | −3.0939 | −3.0422 | −3.1648 | −3.0950 |
| |V6 − V5| | 32.2990 | 33.5630 | 36.7050 | 35.6430 | 32.4890 | 42.8470 |

| Conditional Expression | Seventh Embodiment | Eighth Embodiment | Ninth Embodiment | Tenth Embodiment | Eleventh Embodiment |
|---|---|---|---|---|---|
| HFOV/L1S1ED | 15.6876 | 15.5039 | 15.1950 | 15.1159 | 14.7468 |
| L1S1ED/TTL | 0.6750 | 0.6830 | 0.6968 | 0.7005 | 0.6781 |
| f1/f2 | 1.1901 | 1.2251 | 1.4225 | 1.4185 | 1.2883 |
| f1/f3 | −0.9329 | −0.8851 | −1.0113 | −0.8830 | −0.8714 |
| V1 − V3 | 22.7200 | 22.7200 | 22.7200 | 24.0000 | 24.0330 |
| V5 − V6 | 40.3630 | 38.7530 | 49.8580 | 49.8000 | 49.8680 |

TABLE 24-continued

| | | | | | |
|---|---|---|---|---|---|
| HFOV*f | 342.3024 | 343.7748 | 343.7694 | 345.8754 | 347.3280 |
| f/f6 | −0.7157 | −0.6615 | −0.5990 | −0.6007 | −0.5318 |
| f1/f | −3.3785 | −3.4034 | −3.5680 | −3.5778 | −3.5595 |
| f1/f4 | −0.4060 | −0.4658 | −0.5164 | −0.7132 | −0.6445 |
| f1/f7 | −1.2490 | −1.1338 | −1.1188 | −1.1706 | −1.0967 |
| f5/f6 | −1.1973 | −1.1892 | −1.2080 | −1.2772 | −1.2440 |
| (f5 + f7)/f6 | −3.1331 | −3.1749 | −3.1182 | −3.1130 | −2.9701 |
| |V6 − V5| | 40.3630 | 38.7530 | 49.8580 | 49.8000 | 49.8680 |

TABLE 25

| Conditional Expression | First Embodiment | Second Embodiment | Third Embodiment | Fourth Embodiment | Fifth Embodiment | Sixth Embodiment |
|---|---|---|---|---|---|---|
| ImgHT/TTL | 0.21694 | 0.21694 | 0.21693 | 0.21694 | 0.21695 | 0.21694 |
| SL/TTL | 0.46653 | 0.46318 | 0.47485 | 0.48012 | 0.46903 | 0.48100 |
| TTL/f | 9.06744 | 9.06768 | 8.99443 | 8.99390 | 8.93884 | 8.93951 |
| (R7 + R8)/(R7 − R8) | 3.65256 | 3.73027 | 3.83408 | 4.79806 | 4.92987 | 6.98615 |
| (R8 + R9)/(R8 − R9) | −0.14944 | −0.12962 | −0.11956 | −0.11627 | −0.12353 | −0.16200 |
| (T2 + T3)/D23 | 1.29771 | 1.22022 | 1.49542 | 1.73650 | 1.69050 | 1.53623 |
| (T3 + T4)/D34 | 6.00377 | 5.20033 | 4.15882 | 3.78452 | 3.26359 | 2.60714 |
| (T4 + T5)/D45 | 9.64507 | 12.63869 | 9.00524 | 5.94774 | 11.26974 | 5.74863 |
| T3/D34 | 3.18679 | 2.71192 | 2.22207 | 1.96387 | 1.43026 | 1.23878 |
| T4/D45 | 4.20563 | 5.48540 | 3.76702 | 2.45819 | 5.10197 | 2.44262 |
| D23/D67 | 12.61842 | 12.48750 | 6.02574 | 6.06195 | 3.38746 | 3.84457 |
| D45/D67 | 2.33553 | 1.71250 | 1.40441 | 2.53982 | 0.86610 | 1.60997 |

| Conditional Expression | Seventh Embodiment | Eighth Embodiment | Ninth Embodiment | Tenth Embodiment | Eleventh Embodiment |
|---|---|---|---|---|---|
| ImgHT/TTL | 0.21695 | 0.21697 | 0.21693 | 0.21694 | 0.20489 |
| SL/TTL | 0.47003 | 0.46347 | 0.45321 | 0.45759 | 0.44378 |
| TTL/f | 8.93894 | 8.90013 | 8.90184 | 8.84712 | 9.32836 |
| (R7 + R8)/(R7 − R8) | 7.82300 | 5.18516 | 4.76331 | 2.77159 | 3.33493 |
| (R8 + R9)/(R8 − R9) | −0.12480 | −0.06676 | −0.03782 | −0.09402 | −0.13622 |
| (T2 + T3)/D23 | 2.05741 | 1.77273 | 1.50068 | 1.49824 | 1.47165 |
| (T3 + T4)/D34 | 3.24573 | 3.21421 | 3.23843 | 3.81258 | 5.86760 |
| (T4 + T5)/D45 | 7.08333 | 8.28831 | 14.27727 | 9.00545 | 12.79321 |
| T3/D34 | 1.61775 | 1.69222 | 1.62731 | 1.74181 | 2.19003 |
| T4/D45 | 3.13816 | 3.50649 | 6.32727 | 4.30518 | 7.28704 |
| D23/D67 | 2.44898 | 2.49136 | 2.49576 | 2.85915 | 3.13598 |
| D45/D67 | 1.03401 | 0.73896 | 0.37351 | 0.73843 | 0.67782 |

As described above, an imaging lens system having a wide field of view (FOV) may be implemented.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An imaging lens system, comprising:
a first lens having refractive power;
a second lens having refractive power;
a third lens having a concave object-side surface;
a fourth lens having refractive power, and having a concave object-side surface;
a fifth lens having refractive power;
a sixth lens having a concave object-side surface; and
a seventh lens having refractive power;
wherein the first to seventh lenses are sequentially disposed from an object side to an imaging side, and
wherein:
20<V1−V3, and
190°≤FOV,
where V1 is an Abbe number of the first lens, V3 is an Abbe number of the third lens, and FOV is a field of view of the imaging lens system.

2. The imaging lens system of claim 1, wherein the third lens has positive refractive power.

3. The imaging lens system of claim 1, wherein the fourth lens has positive refractive power.

4. The imaging lens system of claim 1, wherein the fifth lens has a convex object-side surface.

5. The imaging lens system of claim 1, wherein the sixth lens has a concave image-side surface.

6. The imaging lens system of claim 1, wherein the seventh lens has a convex object-side surface.

7. The imaging lens system of claim 1, wherein:

5.0 mm<f1234<12.5 mm, where f1234 is a synthetic focal length of the first lens to the fourth lens.

8. The imaging lens system of claim 1, wherein:

5.50 mm<f567<10.0 mm, where f567 is a synthetic focal length of the fifth lens to the seventh lens.

9. An imaging lens system, comprising:
a first lens having negative refractive power;
a second lens having negative refractive power;
a third lens having refractive power;
a fourth lens having concave object-side surface;
a fifth lens having refractive power;
a sixth lens having refractive power; and
a seventh lens having refractive power,
wherein:

−3.6<(f5+f7)/f6<−2.6, and $8.0<TTL/f<10.0,$ where f is a focal length of the imaging lens system, f5 is a focal length of the fifth lens, f6 is a focal length of the sixth lens, f7 is a focal length of the seventh lens, and TTL is a distance from an object-side surface of the first lens to an imaging plane.

10. The imaging lens system of claim 9, wherein:

$190° \leq FOV,$ where FOV is a field of view of the imaging lens system.

11. The imaging lens system of claim 10, wherein:

−1.0<f1/f4<−0.1, where f1 is a focal length of the first lens, and f4 is a focal length of the fourth lens.

12. The imaging lens system of claim 10, wherein:

−2.0<f1/f7<−1.0, where f1 is a focal length of the first lens.

13. The imaging lens system of claim 10, wherein:

$-2.0<f5/f6<-1.0.$

14. The imaging lens system of claim 10, wherein:

2.0<(R7+R8)/(R7−R8)<8.0, where R7 is a radius of curvature of an object-side surface of the fourth lens, and R8 is a radius of curvature of an image-side surface of the fourth lens.

15. The imaging lens system of claim 10, wherein:

$0.20<ImgHT/TTL<0.30,$ where ImgHT is a height of the imaging plane.

16. An imaging lens system, comprising:
a first lens having negative refractive power;
a second lens having negative refractive power;
a third lens having positive refractive power, and having a concave object-side surface;
a fourth lens having positive refractive power, and having a concave object-side surface;
a fifth lens having positive refractive power;
a sixth lens having negative refractive power; and
a seventh lens having positive refractive power;
wherein the first to seventh lenses are sequentially disposed from an object side to an imaging side,
wherein the fifth lens image-side surface is spaced apart from the sixth lens object-side surface and the sixth lens image-side surface is spaced apart from the seventh lens object-side surface,
wherein 20<V1−V3, where V1 is an Abbe number of the first lens and V3 is an Abbe number of the third lens, and
wherein 190°≤FOV, where FOV is a field of view of the imaging lens system.

17. The imaging lens system of claim 16, wherein the second lens has a concave object-side surface.

18. The imaging lens system of claim 16, wherein:

−3.6<(f5+f7)/f6<−2.6, and $8.0<TTL/f<10.0,$ where f is a focal length of the imaging lens system, f5 is a focal length of the fifth lens, f6 is a focal length of the sixth lens, f7 is a focal length of the seventh lens, and TTL is a distance from an object-side surface of the first lens to an imaging plane.

* * * * *